(12) United States Patent
Tian et al.

(10) Patent No.: US 8,335,666 B2
(45) Date of Patent: Dec. 18, 2012

(54) THREE-DIMENSIONAL MODEL DATA GENERATING METHOD, AND THREE DIMENSIONAL MODEL DATA GENERATING APPARATUS

(75) Inventors: Xiaodong Tian, Davis, CA (US); Makoto Fujishima, Yamatokoriyama (JP)

(73) Assignee: Intelligent Manufacturing Systems International, San Francisco, CA (US)

( * ) Notice: Subject to any disclaimer, the term of this patent is extended or adjusted under 35 U.S.C. 154(b) by 1147 days.

(21) Appl. No.: 12/281,112

(22) PCT Filed: Aug. 31, 2007

(86) PCT No.: PCT/JP2007/066987
§ 371 (c)(1),
(2), (4) Date: Aug. 28, 2008

(87) PCT Pub. No.: WO2008/026722
PCT Pub. Date: Mar. 6, 2008

(65) Prior Publication Data
US 2009/0070077 A1    Mar. 12, 2009

Related U.S. Application Data

(60) Provisional application No. 60/824,285, filed on Sep. 1, 2006, provisional application No. 60/863,107, filed on Oct. 26, 2006.

(51) Int. Cl.
*G06F 17/50* (2006.01)
(52) U.S. Cl. .................... 703/1; 703/2; 700/98

(58) Field of Classification Search .................. 703/1, 2; 700/98; 345/442, 443; 382/199, 203, 209
See application file for complete search history.

(56) References Cited

U.S. PATENT DOCUMENTS
2004/0107018 A1*  6/2004  Nakamura .................. 700/98

FOREIGN PATENT DOCUMENTS
| EP | 1 424 656 A2 | 6/2004 |
| JP | 7-237158 A | 9/1995 |
| JP | 2004-185123 A | 7/2004 |
| WO | 95-17995 A1 | 7/1995 |

OTHER PUBLICATIONS
International Search Report of PCT/JP2007/066987, date of mailing Oct. 2, 2007, 1 page.

* cited by examiner

*Primary Examiner* — Kamini S Shah
*Assistant Examiner* — Luke Osborne
(74) *Attorney, Agent, or Firm* — Westerman, Hattori, Daniels & Adrian, LLP

(57) ABSTRACT

An apparatus 1 for generating three-dimensional model data is provided with: two CCD cameras 13 and 14 for imaging an attached object attached to a machine tool to generate two-dimensional image data; a first model-data storing section 19 for storing model data of the attached object, a second model-data storing section 21 for storing the model data related to at least a part of the machine tool; an edge detecting section 17 for detecting edges; a shape-feature recognizing section 18 for recognizing a shape feature; an object recognizing section 20 for recognizing the model data of the attached object imparted with the recognized shape feature; and a model-data generating section 22 for generating three-dimensional model data including the attached object and a part of the machine tool.

9 Claims, 14 Drawing Sheets

(a)

(b)

(a)

(b)

(a)          (b)

(a)

(b)

THREE-DIMENSIONAL MODEL DATA GENERATING METHOD, AND THREE DIMENSIONAL MODEL DATA GENERATING APPARATUS

FIELD OF THE INVENTION

The present invention relates to a method and an apparatus for generating three-dimensional model data comprising an attached object including a workpiece, a jig for attaching the workpiece and the like, attached to a machine tool and at least a part of the machine tool.

BACKGROUND OF THE INVENTION

For example, a machine tool is configured by: a table having a workpiece being mounted and fixed to its top surface by the jig for attaching the workpiece; a main spindle for retaining a tool; a drive mechanism for moving the table and the main spindle (workpiece and tool) relative to each other; a control device for controlling the drive mechanism based on an NC program previously created; and the like.

The NC program is created by an operator, a programming device, or the like. However, if there is an error, there is a possibility that an accident in which the tool and the workpiece or the jig for attaching the workpiece interfere with each other occurs. To avoid this, as disclosed in Japanese Unexamined Patent Application Publication No. 2006-004128, an interference simulation is conducted on a computer using three-dimensional model data of a machine tool to check whether the NC program has an error.

Patent document 1: Japanese Unexamined Patent Application Publication No. 2006-004128

BRIEF SUMMARY OF THE INVENTION

Problem Invention is to Solve

Incidentally, in the interference simulation using the three-dimensional model data, when a workpiece subject to machining (that is, a workpiece on the table) or a jig for attaching the workpiece is changed, at least a workpiece portion or a jig portion of the three-dimensional model data of the machine tool must be corrected and updated to accommodate the change.

However, when the three-dimensional model data of the workpiece or the jig (the attached object) are newly created and the created three-dimensional model data are used to correct and update the three-dimensional model data of the machine tool, it is ineffective. Alternatively, the three-dimensional model data of the attached object, which are used for correction and updating, are sometimes caused to be different from their actual shapes by, for example, an error by an operator who creates the data, a design change after the three-dimensional model data of the workpiece are created, and other reasons. In this case, a correct interference simulation cannot be performed. There is another case where an attaching condition of the attached object on the three-dimensional model of the machine tool and an actual attaching condition differ, and in this case also, the correct interference simulation cannot be performed.

Therefore, it is convenient when it is possible to easily and efficiently generate the three-dimensional model data in accordance with the actual condition of the machine tool.

The present invention has been conducted under the aforementioned circumstances. It is an object of the present invention to provide a method and an apparatus for generating correctly and efficiently three-dimensional model data including an attached object attached to a machine tool and at least a part of the machine tool.

Means for Resolving the Problem

In order to achieve the aforementioned object, the present invention is a method for generating three-dimensional model data including an attached object attached to a machine tool and at least a part of the machine tool, comprising:

a first step of storing model data into a storing section, the model data are related to a three-dimensional model of the at least part of the machine tool and the attached object attached to the machine tool, and include at least shape data that define shapes of the machine tool and the attached object;

a second step, in which imaging means are used to image the attached object attached to the machine tool from two view points, i.e., a first view point and a second view point apart from the first view point, for generating two-dimensional image data at each of the view points;

a third step for recognizing a shape feature of the attached object based on the two two-dimensional image data generated in the second step;

a fourth step for recognizing model data of the attached object imparted with the shape feature, based on the shape feature recognized in the third step and the model data of the attached object stored in the storing section; and a fifth step for, based on the shape feature and the model data each recognized in the third step and the fourth step, calculating a position and an attitude, of the three-dimensional model of the attached object, on the three-dimensional model of the machine tool, and thereafter, generating the three-dimensional model data including the attached object and at least the part of the machine tool, based on calculated position and attitude, the model data recognized in the fourth step, and the model data which are stored in the storing section and are related to the at least part of the machine tool, wherein each step is sequentially performed.

The method for generating model data can be preferably implemented by an apparatus for generating model data below:

That is, the apparatus for generating model data is:

An apparatus for generating three-dimensional model data including an attached object attached to a machine tool and at least a part of the machine tool, comprising:

first imaging means for imaging the attached object attached to the machine tool to generate two-dimensional image data;

second imaging means, disposed apart from the first imaging means, for imaging the attached object attached to the machine tool to generate two-dimensional image data;

first model-data storing means for storing data related to a three-dimensional model of the attached object attached to the machine tool, the model data including at least shape data that define a shape of the attached object;

second model-data storing means for storing data related to a three-dimensional model about the at least part of the machine tool, the model data including at least shape data that define a shape about the at least part of the machine tool;

image processing means, based on the two-dimensional image data, each of which are generated by the first and second imaging means, for recognizing a shape feature of the attached object;

object recognizing means, based on the model data stored in the first model-data storing means and the shape feature recognized by the image processing means, for recognizing model data of an attached object imparted with the shape feature; and model-data generating means for calculating, based on the model data recognized by the object recognizing means and the shape feature recognized by the image processing means, a position and an attitude, of the three-dimensional model of the attached object, on the three-dimensional model of the machine tool, and thereafter, generating three-dimensional model data including the attached object and at least the part of the machine tool, based on the calculated position and attitude, the model data recognized by the object recognizing means, and the model data stored in the second model-data storing means.

According to the apparatus for generating three-dimensional model data, in the first model-data storing means, the model data (three-dimensional model data) of the attached object attached to the machine tool are previously stored, and in the second model-data storing means, the model data (three-dimensional model data (for example, model data of a machining center including at least a table on which the workpiece is mounted, or model data of a lathe including at least a main spindle for holding the workpiece)) related to at least a part of the machine tool are previously stored. In the first model-data storing means, the model data about one type of attached object may be stored, or the model data about a plurality of attached objects which may be attached to the machine tool may be stored. Further, the attached object may include, but not limited to, a workpiece, a jig for attaching the workpiece, or the like. When the attached object is the workpiece or the jig, at least one of: model data of the workpiece; model data of the jig; and model data in which the workpiece and the jig are integrally configured, is stored in the first model-data storing means.

The attached object attached to the machine tool is imaged by the first imaging means and the second imaging means, and when two-dimensional image data are each generated, the shape feature of the attached object is recognized by the image processing means, based on each of the generated two-dimensional image data. Thereafter, based on the model data stored in the first model-data storing means and the shape feature recognized by the image processing means, the model data of the attached object imparted with the shape feature is recognized by the object recognizing means.

Thereafter, firstly, based on the model data recognized by the object recognizing means and the shape feature recognized by the image processing means, a position and an attitude, of the three-dimensional model of the attached object, on the three-dimensional model of the machine tool are calculated by the model-data generating means, and thereafter, based on the calculated position and attitude, the model data recognized by the object recognizing means, and the model data stored in the second model-data storing means, the three-dimensional model data including the attached object and a part of the machine tool are generated.

Thus, according to a method and an apparatus for generating three-dimensional model data according to the present invention, three-dimensional model data including a attached object attached to a machine tool and at least a part of the machine tool are generated based on two-dimensional image data each obtained from imaging means. Thus, it is possible to generate easily and effectively correct three-dimensional model data in which a shape of the attached object, an attaching position thereof, and an attaching attitude thereof match the actual state. It becomes also possible to perform an interference simulation using the three-dimensional model data according to the actual state of the machine tool, thereby providing a precision simulation result.

The image processing means may be comprising: an edge detecting means for extracting corners of the attached object, based on the two-dimensional image data, each of which are generated by the first imaging means and the second imaging means, to detect edges that connect among the extracted corners, thereby detecting the edges of the attached object in the respective two-dimensional images; and shape-feature recognizing means for evaluating a corresponding relation of the edges between each of the two-dimensional images based on the edges in the two-dimensional images each detected by the edge detecting means, and recognizing the shape feature of the attached object based on the edges determined to have the corresponding relation.

In this case, upon extracting the corners of the attached object, the corners of an object to be imaged, including the attached object, in each of the two-dimensional images are firstly detected, for example, and thereafter, the detected corners and the corners of the object to be imaged when the attached object is not attached to the machine tool are compared to extract the corners of the attached object only. Further, upon recognizing the shape feature of the attached object, position information of an attached object edge portion in a three-dimensional space is calculated by a principle of a triangulation, based on the edges determined to have a corresponding relation, and thus, it become possible to recognize the shape feature of the attached object.

Further, the object recognizing means may be configured to extract the shape feature of the attached object related to the model data based on the model data stored in the first model-data storing means to check whether the extracted shape feature and the shape feature recognized by the image processing means match, thereby recognizing the model data of the attached object imparted with the shape feature that matches the shape feature recognized by the image processing means, out of the model data stored in the first model-data storing means.

Further, the model-data generating means may be configured to calculate, based on the shape feature of the attached object recognized by the image processing means and the model data of the attached object recognized by the object recognizing means, various components of a matrix indicating a rotational angle and a matrix indicating an amount of translation, which are obtained when a rotational shift and translation are performed so that respectively corresponding portions of a shape specified by the shape feature and the model data overlap to calculate a position and an attitude, of the three-dimensional model of the attached object, on the three-dimensional model of the machine tool, based on the calculated components of each matrix.

The second imaging means may be disposed such that its optical axis is parallel to an optical axis of the first imaging means, and that it is kept apart by a distance from the first imaging means in a direction perpendicular to the optical axis of the first imaging means.

In the present invention, in the case of generating the three-dimensional model data of the machine tool including the workpiece and the jig, for example, the model data of the workpiece and the model data of the jig are each stored in the first model-data storing means, and the workpiece is firstly imaged by the imaging means to generate the three-dimensional model data of the machine tool including the workpiece, and thereafter, the jig is imaged by the imaging means, whereby the three-dimensional model data of the machine tool including the workpiece and the jig may be generated. In contrary thereto, the jig is firstly imaged by the imaging means to generate the three-dimensional model data of the machine tool including the jig, and thereafter, the workpiece is imaged by the imaging means, whereby the three-dimensional model data of the machine tool including the workpiece and the jig may be generated. Further, in addition thereto, the model data in which the workpiece and the jig are integrally configured are stored in the first model-data storing means, and the workpiece and the jig are imaged by the imaging means, whereby the three-dimensional model data of the machine tool including the workpiece and the jig may be generated.

Effects of the Invention

As described above, according to the method and the apparatus for generating three-dimensional model data of the present invention, it is possible to correctly and efficiently generate three-dimensional model data including an attached object attached to a machine tool and at least a part of the machine tool.

| Legend | |
|---|---|
| 1 | Apparatus for generating three-dimensional model data |
| 10 | Computer |
| 11 | Input device |
| 12 | Screen display device |
| 13 | First CCD camera |
| 14 | Second CCD camera |
| 15 | Image-data storing section |
| 16 | Camera-parameter storing section |
| 17 | Edge detecting section |
| 18 | Shape-feature recognizing section |
| 19 | First model-data storing section |
| 20 | Object recognizing section |
| 21 | Second model-data storing section |
| 22 | Model-data generating section |
| 23 | Third model-data storing section |
| 30 | Machine tool |
| 31 | Bed |
| 32 | Base |
| 33 | Left-side wall |
| 34 | Right-side wall |
| 35 | Back-side wall |
| 36 | First saddle |
| 37 | Second saddle |
| 38 | Spindle head |
| 39 | Main spindle |
| 40 | Table |
| T | Tool |
| W | Workpiece |

DETAILED DESCRIPTION OF THE INVENTION

Figure 1:
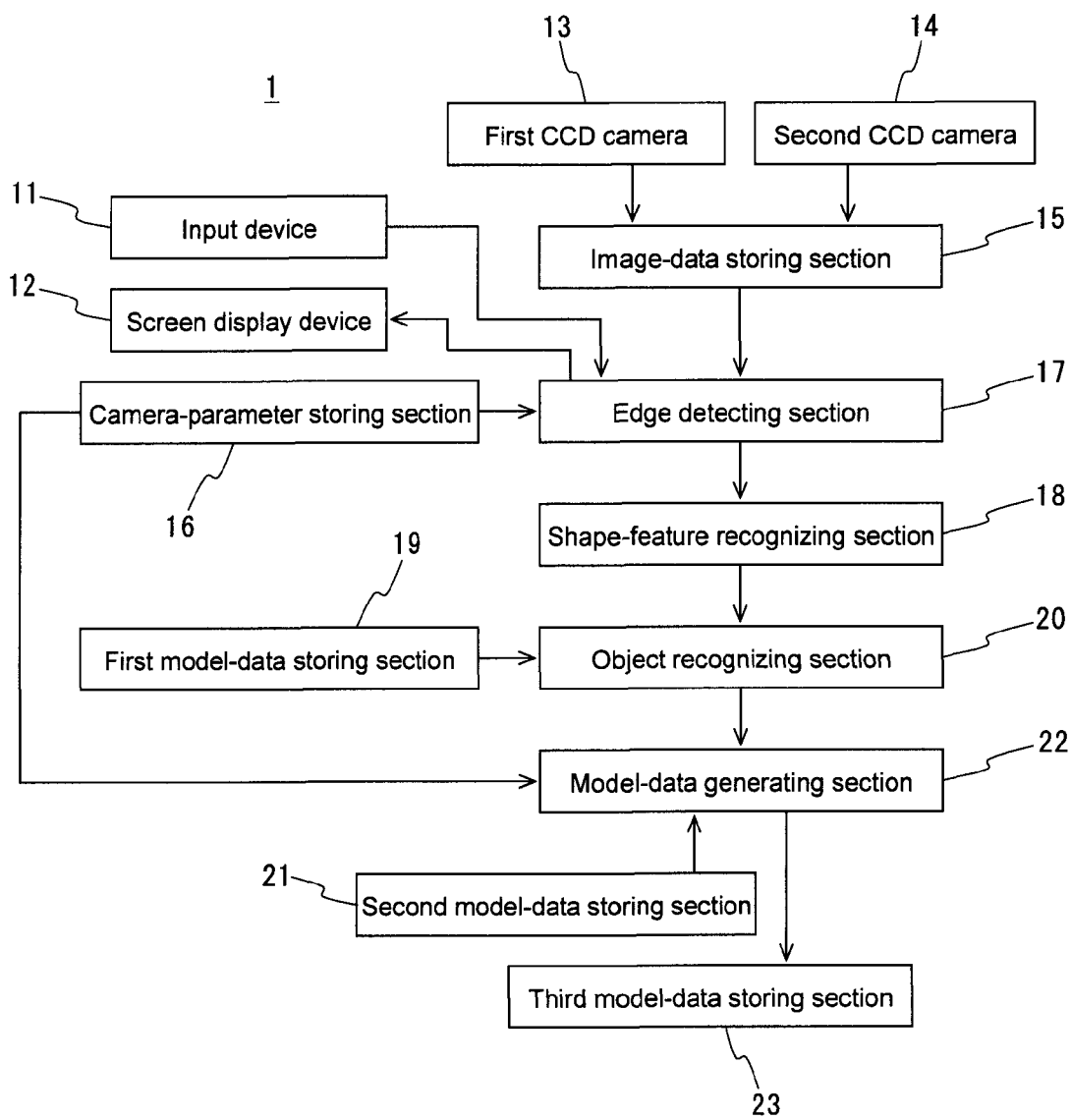
FIG. 1 is a block diagram showing a schematic configuration of an apparatus for generating three-dimensional model data according to one embodiment of the present invention.

Hereinafter, a specific embodiment of the present invention will be described with reference to the accompanying drawings. FIG. 1 is a block diagram showing a schematic configuration of an apparatus for generating three-dimensional model data according to one embodiment of the present invention.

Figure 2:
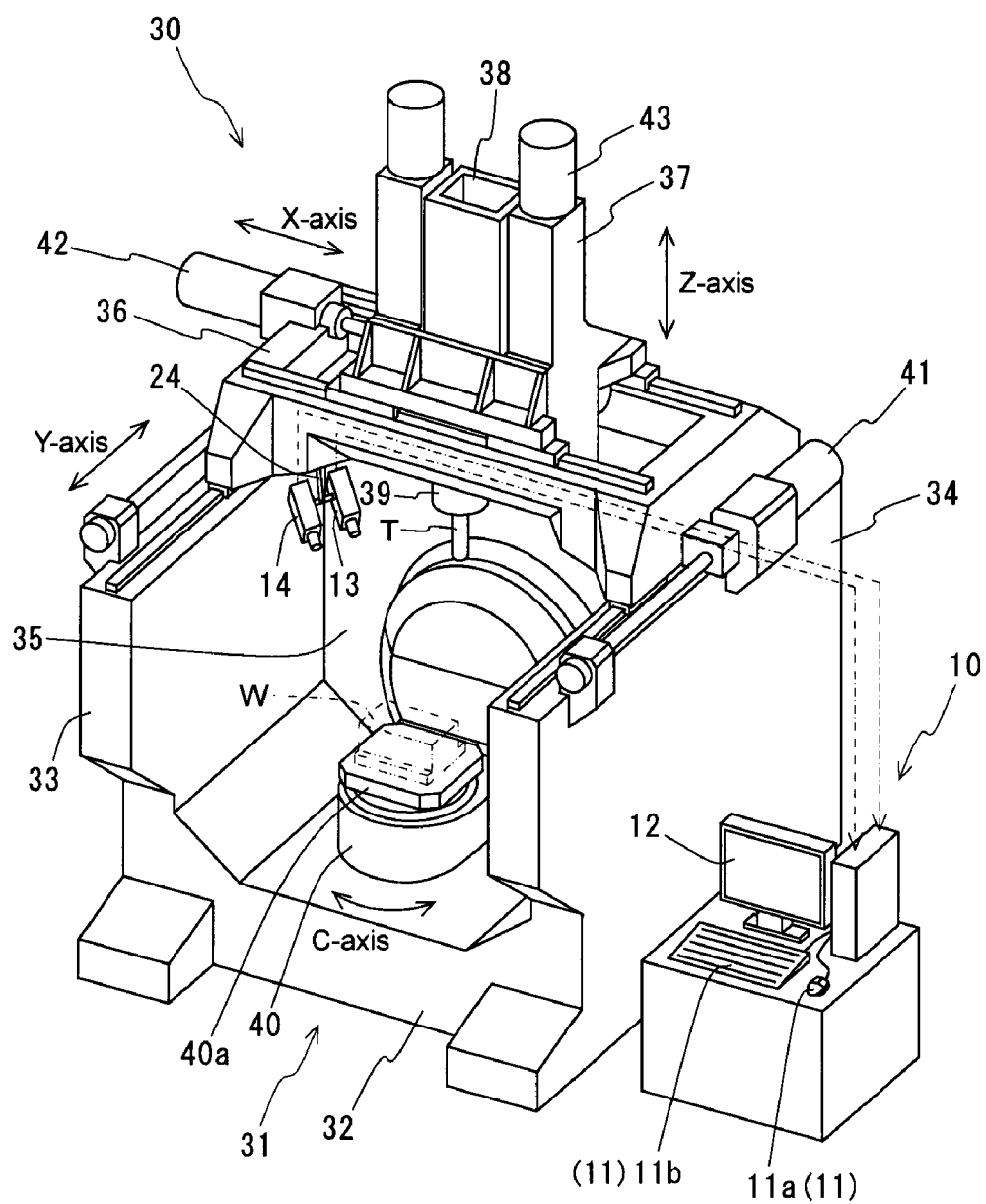
FIG. 2 is a perspective view showing the apparatus for generating three-dimensional model data of the embodiment and a machine tool in which the apparatus is arranged.

As shown in FIG. 1, an apparatus 1 for generating three-dimensional model data of this embodiment is configured by: a computer 10 annexed to a machine tool 30 shown in FIG. 2; and a first CCD camera 13 and a second CCD camera 14. The computer 10 is provided with an input device 11 such as a mouse 11a, a keyboard 11b, or the like, and a screen display device 12. The computer 10 functions as an image-data storing section 15; a camera-parameter storing section 16; an edge detecting section 17; a shape-feature recognizing section 18; a first model-data storing section 19; an object recognizing section 20; a second model-data storing section 21; a model-data generating section 22; and a third model-data storing section 23.

Firstly, a description is given of the machine tool 30.

As shown in FIG. 2, the machine tool 30 is of a type called a vertical machining center, and is provided with: a bed 31; a first saddle 36 which is disposed on the bed 31 and freely moves in a front-to-back direction (Y-axis direction); a second saddle 37 which is disposed on the first saddle 36 and freely moves in a side-to-side direction (X-axis direction); a spindle head 38 which is disposed on the second saddle 37 and freely moves in a vertical direction (Z-axis direction); a main spindle 39 which is supported by the spindle head 38 to rotate freely about a center axis thereof and which holds a tool T; a table 40 which is disposed on the bed 31 and which has a workpiece W being mounted and fixed to its top surface; and other components. The table 40 is configured such that a mount section 40a on which the workpiece W is mounted and fixed can rotate freely about a rotational center axis (in a C-axis direction) parallel to a Z-axis.

The machine tool 30 is further provided with: a Y-axis feed mechanism 41 for moving the first saddle 36 in the Y-axis direction; an X-axis feed mechanism 42 for moving the second saddle 37 in the X-axis direction; a Z-axis feed mechanism 43 for moving the spindle head 38 in the Z-axis direction; a first rotational drive mechanism (not shown) for rotating the main spindle 39 about its axis; and a second rotational drive mechanism (not shown) for rotating the mount section 40a on the table 40 in the C-axis direction to be indexed to a predetermined rotational angle position.

The bed 31 is configured by: a base 32 that is rectangular when seen in plan view; side walls 33 and 34 (left-side wall 33 and right-side wall 34) disposed upright on both right and left sides of the base 32; a side wall (back-side wall) 35 which is disposed upright on a rear side of the base 32 and which is arranged between the side walls 33 and 34 on the both right and left sides. The table 40 is arranged at the front of the back-side wall 35 and is disposed in a space surrounded by the respective side walls 33, 34, and 35.

The first saddle 36 is supported by the left-side wall 33 and the right-side wall 34 to freely move in the Y-axis direction. The second saddle 37 is supported by the first saddle 36 to move freely in the X-axis direction. The spindle head 38 is supported by the second saddle 37 to move freely in the Z-axis direction. The main spindle 39 is disposed such that its axis is parallel to the Z-axis above the top surface of the table 40, and is supported by a bottom end of the spindle head 38 to rotate freely about the center axis.

Subsequently, a description is given of the apparatus for generating three-dimensional model data 1.

As described above, the apparatus for generating three-dimensional model data 1 is provided with: the first CCD camera 13; the second CCD camera 14; the image-data storing section 15; the camera-parameter storing section 16; the edge detecting section 17; the shape-feature recognizing section 18; the first model-data storing section 19; the object recognizing section 20; the second model-data storing section 21; the model-data generating section 22; and the third model-data storing section 23.

The first CCD camera 13 and the second CCD camera 14 are arranged at a corner formed by the left-side wall 33 and the back-side wall 35 of the bed 31 and mounted via a bracket 24 in an upper area formed by the left-side wall 33 and the back-side wall 35. The first CCD camera 13 and the second CCD camera 14 tilt its optical axis in a diagonally downward direction to image the workpiece W mounted and fixed on the top surface of the table 40 (mount section 40a). The second CCD camera 14 is arranged such that its optical axis is parallel to that of the first CCD camera 13, its image-pickup surface is positioned coplanar to that of the first CCD camera 13, and it is kept apart by a certain distance from the first CCD camera 13. When the workpiece W is imaged, not only the workpiece W but also a part of the table 40 is imaged. A distance between the optical axis of the first CCD camera 13 and that of the second CCD camera 14 is stored in an inter-optical-axis storing section (not shown).

The CCD cameras 13 and 14 each are provided with a plurality of photoelectric converters which are two-dimensionally arranged in a multi-row, multi-column array, digitize voltage signals which are output from the respective photoelectric converters in accordance with an intensity of received light, convert the digitized signals into gray level values, and output these values as two-dimensional gray-level image data which are aligned in the same manner as those of the photoelectric converters. The image-data storing section 15 stores the two-dimensional gray-level image data, each of which are output from the CCD cameras 13 and 14.

The camera-parameter storing section 16 stores internal parameters (a focal length, coordinates of principal points, a radial distortion correction coefficient, a tangential distortion correction coefficient, for example) which are parameters specific to the CCD cameras 13 and 14, and external parameters (a rotation matrix, and a translation vector, for example) indicating positions and attitudes of the CCD cameras 13 and 14 in a coordinate system of the machine tool 30. These parameters are previously calculated by a calibration processing, for example, to be stored.

Figure 3:
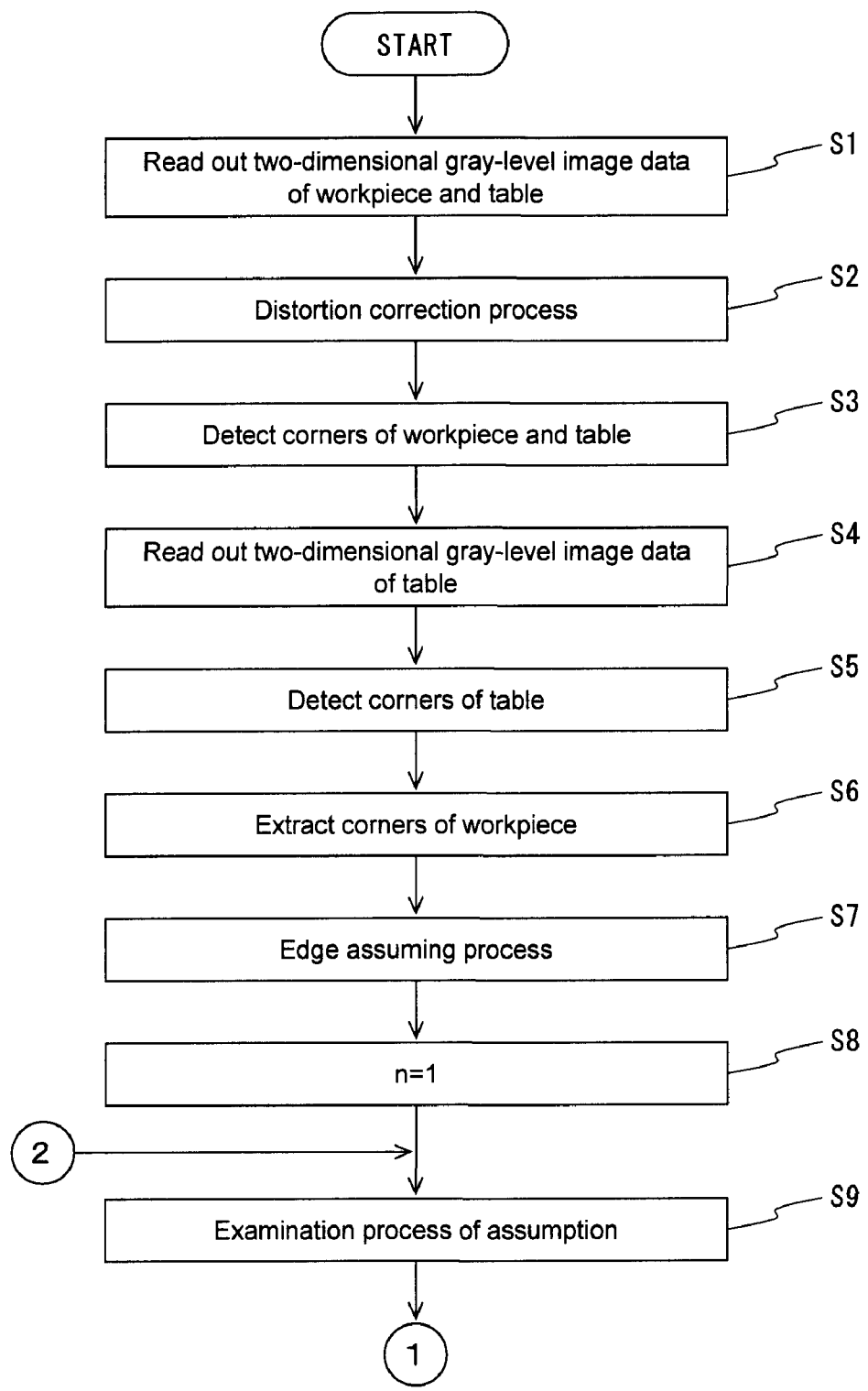
FIG. 3 is a flowchart showing a series of processes in an edge detecting section of the embodiment.
Figure 4:
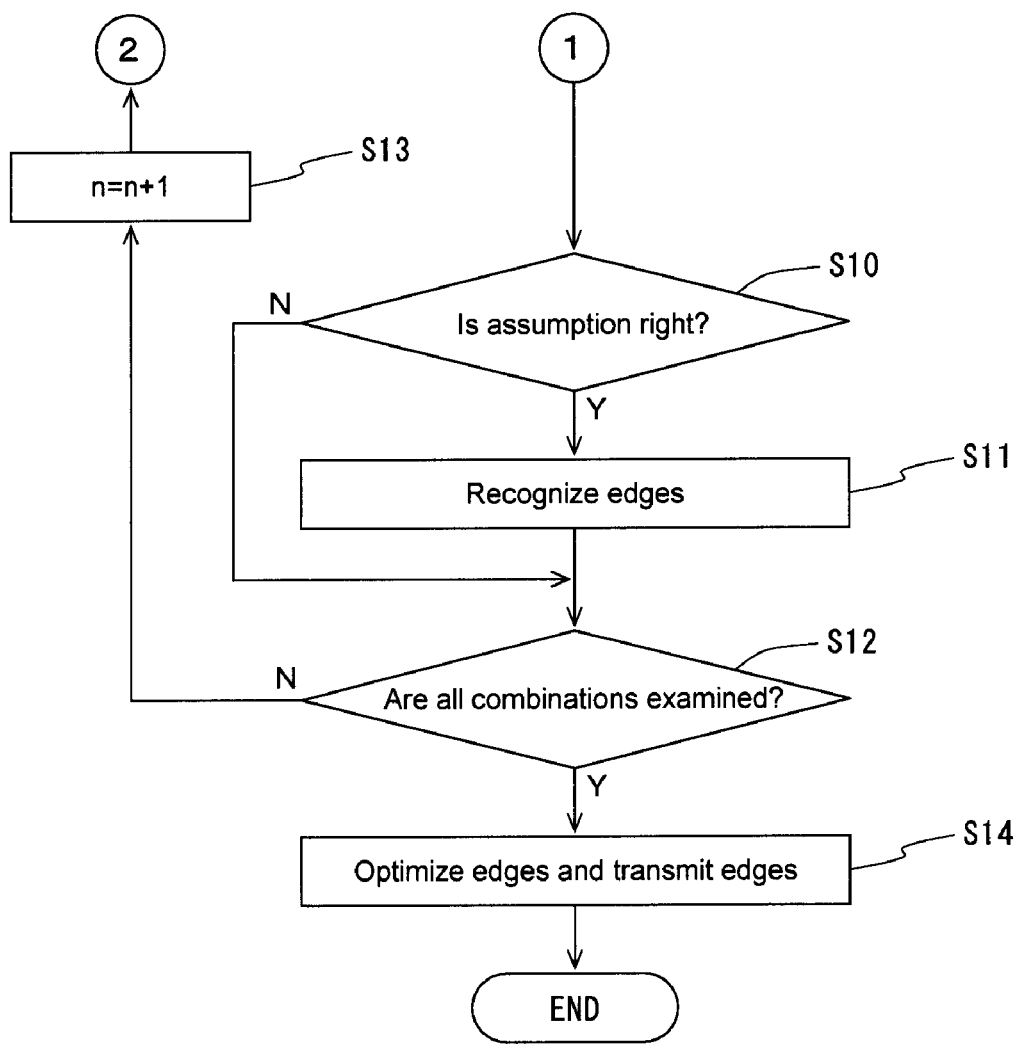
FIG. 4 is a flowchart showing a series of processes in the edge detecting section of the embodiment.

The edge detecting section 17 performs a series of processes as shown in FIG. 3 and FIG. 4, and based on the two-dimensional gray-level image data each stored in the image-data storing section 15 and the internal parameters of the CCD cameras 13 and 14 stored in the camera-parameter storing section 16, the edge detecting section 17 detects edges of the workpiece W regarding each of two-dimensional gray-level images.

That is, the edge detecting section 17 firstly reads out the two-dimensional gray-level image data each stored in the image-data storing section 15 (step S1) to perform a distortion correction of the respective two-dimensional gray-level images (step S2). The distortion correction is performed based on the internal parameters (the radial distortion correction coefficient, the tangential distortion correction coefficient, or the like) stored in the camera-parameter storing section 16, and by bilinear interpolation, for example.

Figure 5:
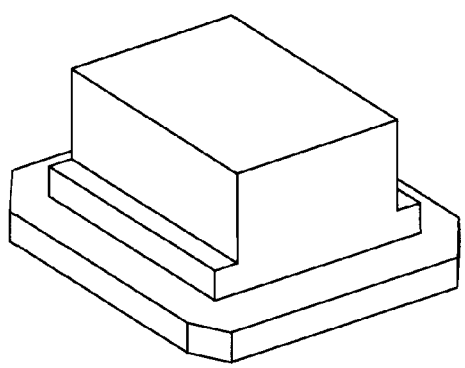
FIG. 5 is an explanatory diagram for explaining detection of corners.
Figure 5:
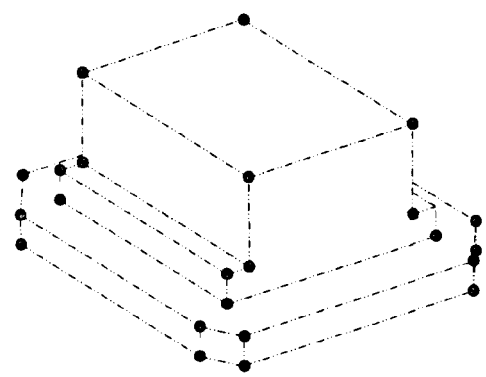

Thereafter, corners of an object to be imaged (the workpiece W and a part of the table 40) in each of the two-dimensional gray-level images are detected (see FIG. 5) (step S3). The corners can be detected using a detection expression by Harris (Expression 1), for example. In the Expression 1, I(x, y) denotes the gray level value. In FIG. 5, (a) of FIG. 5 indicates the two-dimensional gray-level image, and (b) of FIG. 5 indicates the detected corners, respectively.

$$M = \begin{bmatrix} \left(\frac{\partial I}{\partial x}\right)^2 & \left(\frac{\partial I}{\partial x}\right)\left(\frac{\partial I}{\partial y}\right) \\ \left(\frac{\partial I}{\partial x}\right)\left(\frac{\partial I}{\partial y}\right) & \left(\frac{\partial I}{\partial y}\right)^2 \end{bmatrix}$$ [Expression 1]

Figure 6:
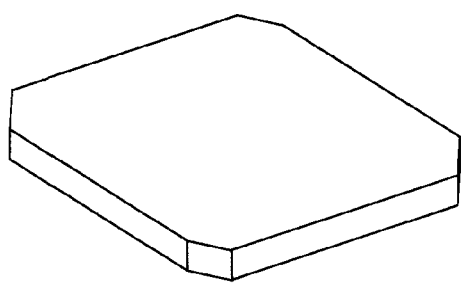
FIG. 6 is an explanatory diagram for explaining the detection of corners.
Figure 6:
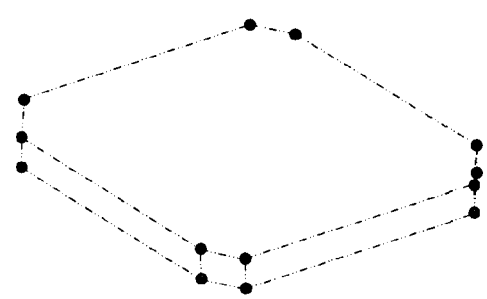

Subsequently, two-dimensional gray-level image data when the workpiece W is not mounted nor fixed to the table 40 (mount section 40a), that is, two-dimensional gray-level image data of only the table 40, are read out from a table-data storing section (not shown) (step S4), and corners of the table 40 are detected in the read-out two-dimensional gray-level images (see FIG. 6) (step S5). In FIG. 6, (a) of FIG. 6 indicates the two-dimensional gray-level image, and (b) of FIG. 6 indicates the detected corners, respectively.

In the table-data storing section (not shown), the two-dimensional gray-level image data which are generated when only the table 40 is imaged by the CCD cameras 13 and 14 and in which the distortion correction is completed may be stored; or virtual image data of the table 40 which are generated based on the three-dimensional model data of the table 40, the two-dimensional gray-level image data obtained when the table 40 is imaged from the same view points as those of the CCD cameras 13 and 14, may be stored. In the former case, after the two-dimensional gray-level image data of the table 40 are read out from the table-data storing section (not shown), the corners are detected similarly to the case described above. On the other hand, in the latter case, after the two-dimensional gray-level image data of the table 40 are read out from the table-data storing section (not shown), the corners are detected based on the three-dimensional model data of the table 40. In addition thereto, information about the corners of the table 40 is stored in the table-data storing section (not shown) in advance, and instead of the processes at the steps S4 and S5, the information about the corners of the table 40 may be read out from the table-data storing section (not shown).

Figure 7:
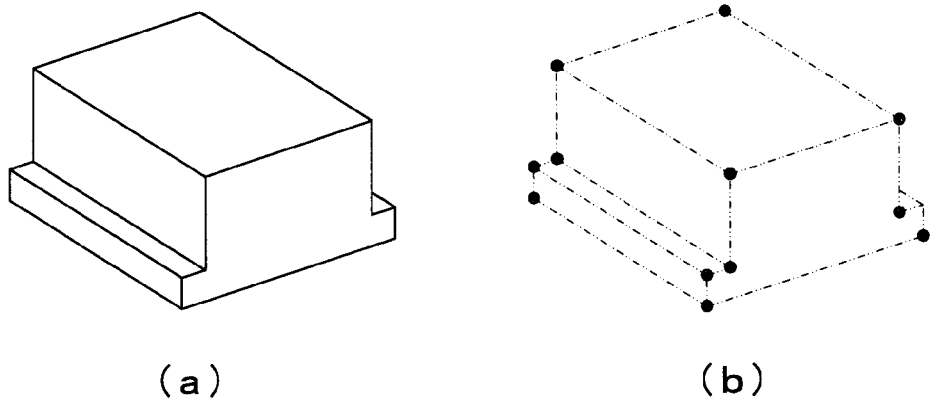
FIG. 7 is an explanatory diagram for explaining the detection of corners.

Subsequently, the corners (the corners of the workpiece W and a part of the table 40) detected at the step S3 and those (the corners of the table 40) detected at the step S5 are compared to extract corners not existing in the same positions, that is, extract the corners of the workpiece W only, (see FIG. 7) (step S6). In FIG. 7, (a) of FIG. 7 indicates the two-dimensional gray-level image of only the workpiece, and (b) of FIG. 7 indicates the extracted corners of the workpiece W, respectively.

Thereafter, all combinations of the two corners are recognized based on the extracted corners, and it is assumed that edges that connect among the corners exist in all the combinations of the recognized corners, (step S7). Subsequently, a counter n is set to 1 (step S8), and it is examined whether the assumption is right about the first combination, that is, it is examined whether the edges exist among the corners (step S9).

Figure 8:
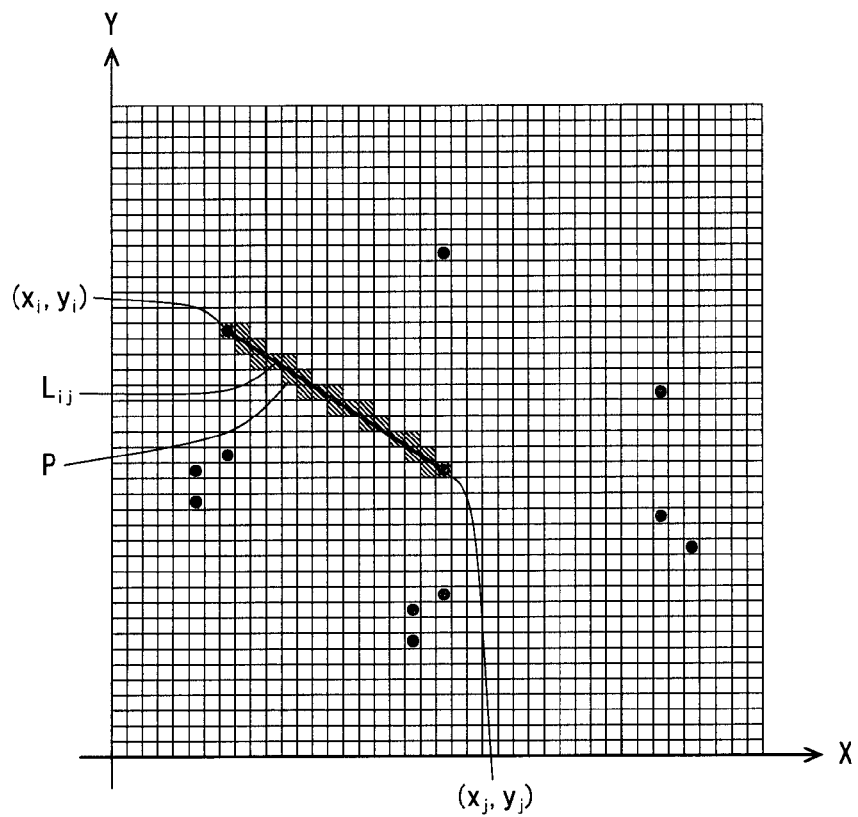
FIG. 8 is an explanatory diagram for explaining detection of edges.

This examination is performed as follows: That is, firstly, as shown in FIG. 8, a direction and a length of an edge $L_{ij}$ that connects corners $(x_i, y_i)$ and $(x_j, y_j)$, and all pixels P on the edge $L_{ij}$ are detected. Further, a total of four pixels each of which is adjacent to the detected pixel P on both sides in the X-axis direction and Y-axis direction is recognized, and based on each of the detected and recognized pixels, maximum values of slopes (change amount) of the gray level values are calculated, respectively.

Subsequently, based on the slopes of the gray level values of all pixels P on the edge $L_{ij}$ and all pixels adjacent thereto, threshold values are set. Thereafter, with respect to each pixel P on the edge $L_{ij}$, it is checked whether it is adjacent to a pixel which indicates a maximum value of slope and its maximum value of slope is higher than the threshold value, and whether at least one pixel, out of the adjacent eight pixels, is larger in slope of the gray level value than the threshold value. The number of pixels P are counted which correspond to the following case: where the pixel is adjacent to a pixel which indicates the maximum value of slope and the maximum value of slope is higher than the threshold value; or where at least one pixel, out of the adjacent pixels, is larger in slope of the gray level value than the threshold value.

In the case where a ratio of the number of the counted pixels P to a total number of the pixels P on the edge $L_{ij}$ is higher than a predetermined ratio determined according to the length of the edge $L_{ij}$, it is determined that the assumption is right (there exist the edges among the corners), and in the case where it is lower, it is determined that the assumption is wrong (there do not exist the edges among the corners).

The examination is thus performed, and in the case where it is determined that the assumption is right (step S10), the edge $L_{ij}$ is recognized as an existing edge (step S11), and the process advances to the step S12. At this time, in the case where there exist edges already recognized (existent edges), a geometric relationship between the edges recognized this time and the edges already recognized is also recognized. On the other hand, when it is determined that the assumption is wrong (step S11), the process advances to the step S12.

Figure 9:
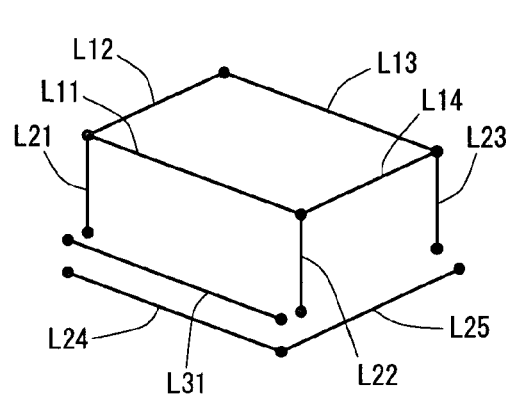
FIG. 9 is an explanatory diagram for explaining the detection of edges.
Figure 9:
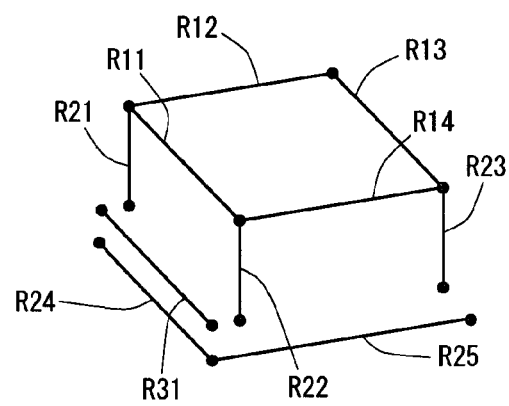

Afterward, while the counter n is updated, it is examined whether the assumption is right about all the combinations of the recognized corners (steps S12, S13). When all the combinations are examined, the existent edges recognized at the step S11 are each optimized by a least squares method based on the pixel in which the slope of the gray level value is the maximum, and the optimized edges are transmitted to the shape-feature recognizing section 18 (step S14), and then, the series of processes is completed. In this manner, as shown in FIG. 9, for example, the edges of the workpiece W are detected. In FIG. 9, (a) of FIG. 9 shows edges (reference numerals L11, L12, L13, L14, L21, L22, L23, L24, L25, and L31) obtained from the two-dimensional gray-level image data generated by the first CCD camera 13, (b) of FIG. 9 shows edges (reference numerals R11, R12, R13, R14, R21, R22, R23, R24, R25, and R31) obtained from the two-dimensional gray-level image data generated by the second CCD camera 14, respectively.

The edge detecting section 17 may be configured not only to automatically detect the corners and the edges but also to detect the corners and the edges based on input of an operator. In this case, the edge detecting section 17 displays on the screen display device 12 a corner selection screen and an edge selection screen, and based on a signal input from the input device 11, the edge detecting section 17 recognizes corners and edges selected by the operator, and adds the recognized corners as detected corners or deletes the recognized corners from the detected corners. Alternatively, the edge detecting section 17 adds the recognized edges as detected edges or deletes the recognized edges from the detected edges.

When the corners and the edges are added, the added corners and edges are regarded as the corners extracted at the step S6 or the edges which are assumed to exist among the corners at the step S7, and the above-described process is performed. When the corners are deleted, the edges connected to the corners are also deleted. The addition or deletion of the corners and the deletion of the edges can be performed by moving a cursor displayed on the screen display device 12 by the mouse 11a to click the corners or the edges, for example. The addition of the edges can be performed by moving the cursor displayed on the screen display device 12 by the mouse 11a to continuously click the respective corners which are formed at the both ends of the edges.

Figure 10:
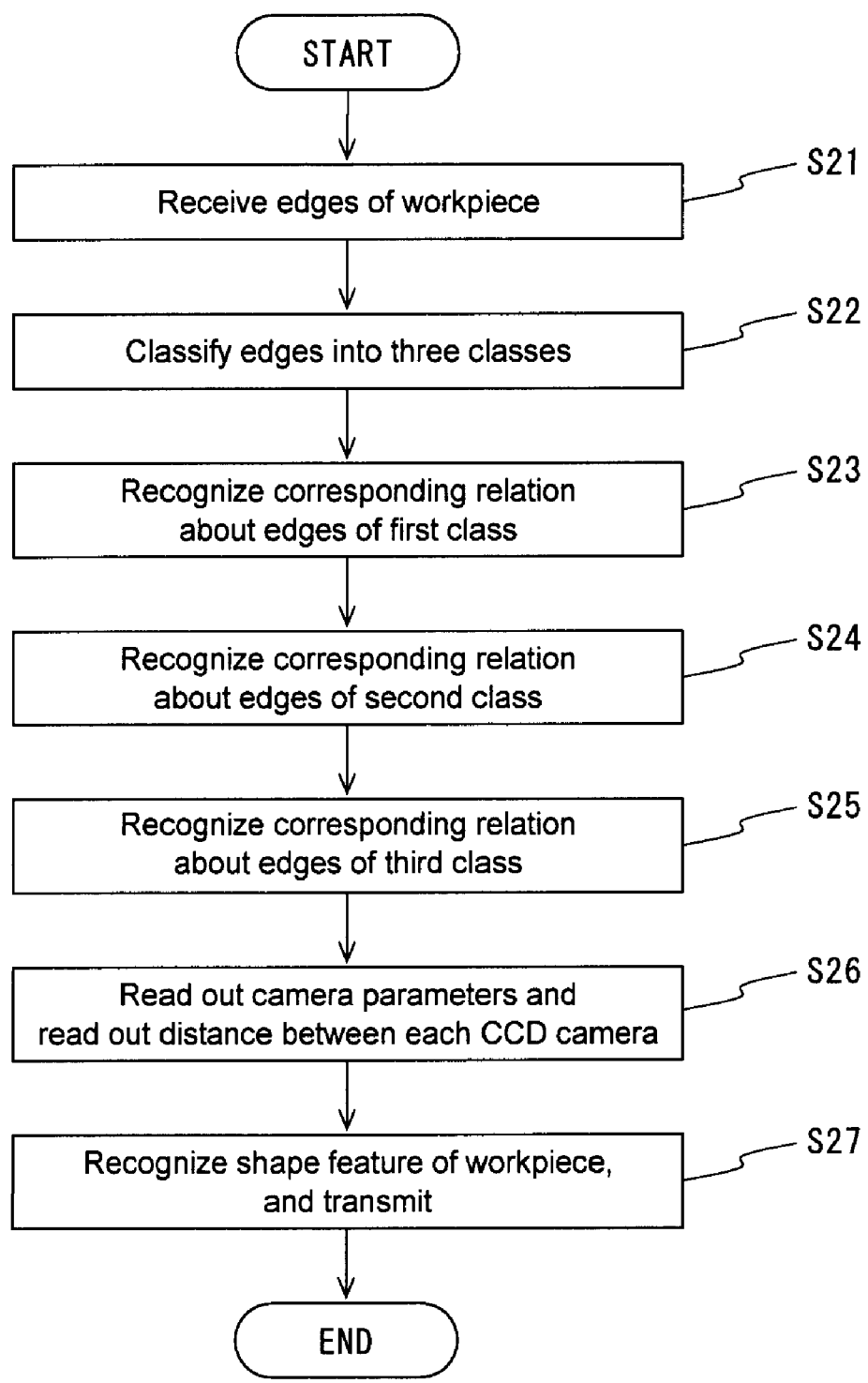
FIG. 10 is a flowchart showing a series of processes in a shape-feature recognizing section of the embodiment.

The shape-feature recognizing section 18 performs a series of processes as shown in FIG. 10, and based on the edges of the workpiece W, each of which are detected by the edge detecting section 17 from the respective two-dimensional gray-level images, recognizes a shape feature of the workpiece W.

That is, the shape-feature recognizing section 18 firstly receives from the edge detecting section 17 the edges of the workpiece W detected in each of the two-dimensional gray-level images (step S21), and as shown in FIG. 9, classifies the detected edges into three classes, i.e., a first class, a second class, and a third class (step S22). To the first class, an edges of which both ends are connected to other edges belongs; To the second class, an edge of which one end only is connected to another edge belongs; and To the third class, an edge of which ends are not connected to any edge belongs. In FIG. 9, the edges indicated by the reference numerals L11, L12, L13, L14, R11, R12, R13, and R14 belong to the firs class; those indicated by L21, L22, L23, L24, L25, R21, R22, R23, R24, and R25 belong to the second class; and those indicated by the reference numerals L31 and R31 belong to the third class.

Subsequently, with respect to the edges of the first class, a combination of edges that satisfy all of several constraint conditions (combination of an edge $L_i$ detected in one two-dimensional gray-level image and an edge $R_j$ detected in the other two-dimensional gray-level image) described below is evaluated (step S23).

Figure 11:
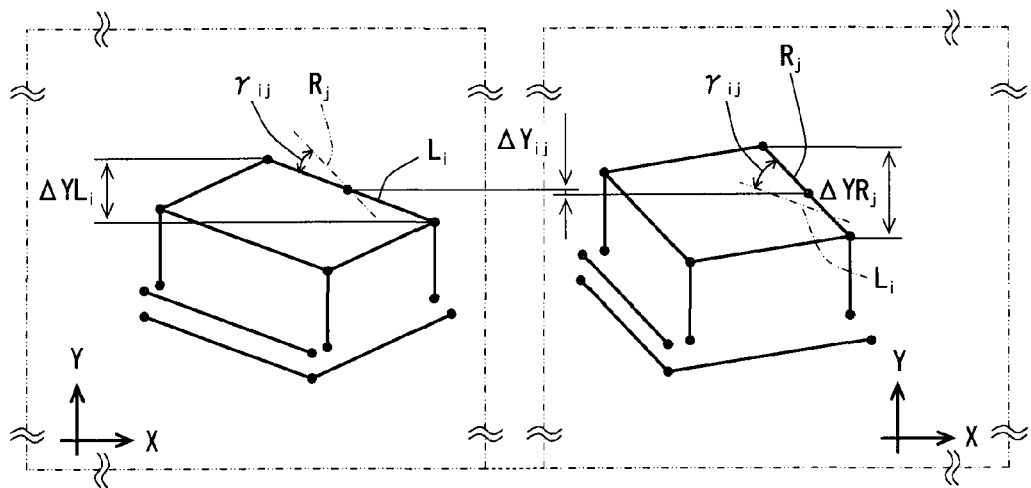
FIG. 11 is an explanatory diagram for explaining recognition of a shape feature of a workpiece.

A first is an epipolar constraint. As shown in FIG. 11, when $L_i$ denotes an edge detected in one two-dimensional gray-level image; $R_j$ denotes an edge detected in the other two-dimensional gray-level image; $\Delta Y_{ij}$ denotes a difference of a Y-axis coordinate value between a middle point of the edge $L_i$ and that of the edge $R_j$; $\Delta YL_i$ denotes a length of the edge $L_i$ in the Y-axis direction; and $\Delta YR_j$ denotes a length of the edge $R_j$ in the Y-axis direction. If a value (value of EC ($L_i$, $R_j$)) obtained by the following expression (Expression 2) is larger than a predetermined threshold value, this condition is satisfied.

$$EC(L_i, R_j) = \begin{cases} 1 (\Delta Y_{ij} < 4) \\ 1 - \dfrac{2\Delta Y_{ij}}{\Delta YL_i + \Delta YR_j} (\Delta Y_{ij} \geq 4) \end{cases} \quad \text{[Expression 2]}$$

A second is a length constraint. When $L(L_i)$ denotes a length of the edge $L_i$ and $L(R_j)$ denotes a length of the edge $R_j$, and if a value (value of LC ($L_i$, $R_j$)) obtained by the following expression (Expression 3) is larger than a predetermined threshold value, this condition is satisfied.

$$LC(L_i, R_j) = \frac{\min[L(L_i), L(R_j)]}{\max[L(L_i), L(R_j)]} \quad \text{[Expression 3]}$$

A third is an orientation constraint. When $\gamma_{ij}$ denotes an angle between the edge $L_i$ and the edge $R_j$, and if a value (value of OC($L_i$, $R_j$)) obtained by the following expression (Expression 4) is smaller than a predetermined threshold value, this condition is satisfied.

$$OC(L_i, R_j) = \gamma_{ij} \quad \text{[Expression 4]}$$

When a combination of edges that satisfy all the constraint conditions is evaluated, it is determined that the edges $L_i$ and $R_j$ related to this combination are in a corresponding relation. In FIG. 9, it is determined that the edge of numeral L11 and that of R11, the edge of numeral L12 and that of R12, the edge of numeral L13 and that of R13, the edge of numeral L14 and that of R14 are in a corresponding relation, respectively. Upon thus evaluating the combination of the edges, combinations that satisfy these conditions are evaluated out of all the combinations.

Thereafter, with respect to the edges of the second class, a combination (combination of the edge $L_i$ detected in one two-dimensional gray-level image and the edge $R_j$ detected in the other two-dimensional gray-level image) of edges that satisfy all the constraint conditions 1 to 3 (the epipolar constraint, the length constraint, and the orientation constraint) is evaluated (step S24).

Figure 12:
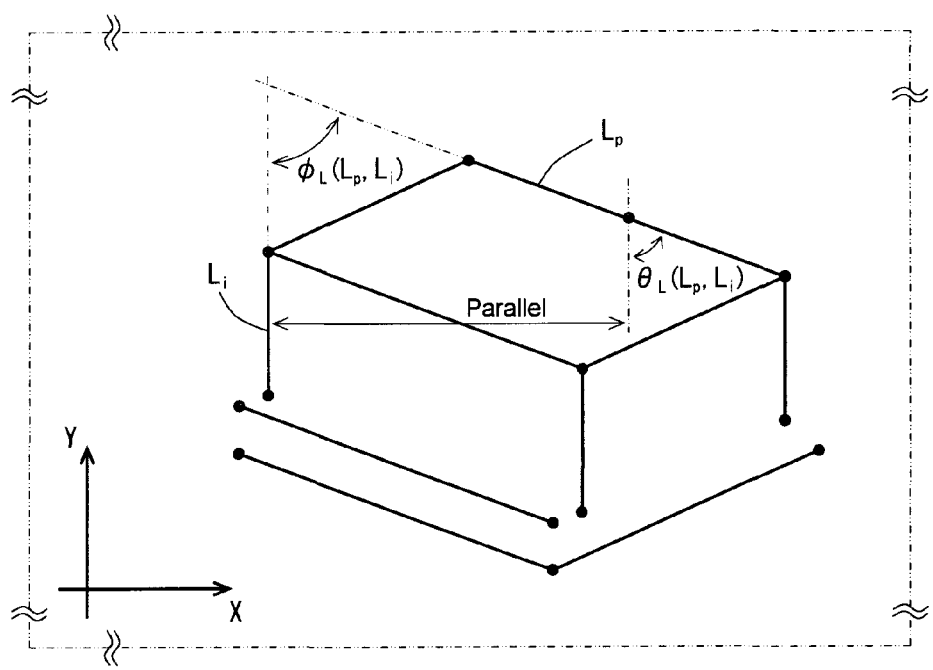
FIG. 12 is an explanatory diagram for explaining the recognition of a shape feature of a workpiece.
Figure 13:
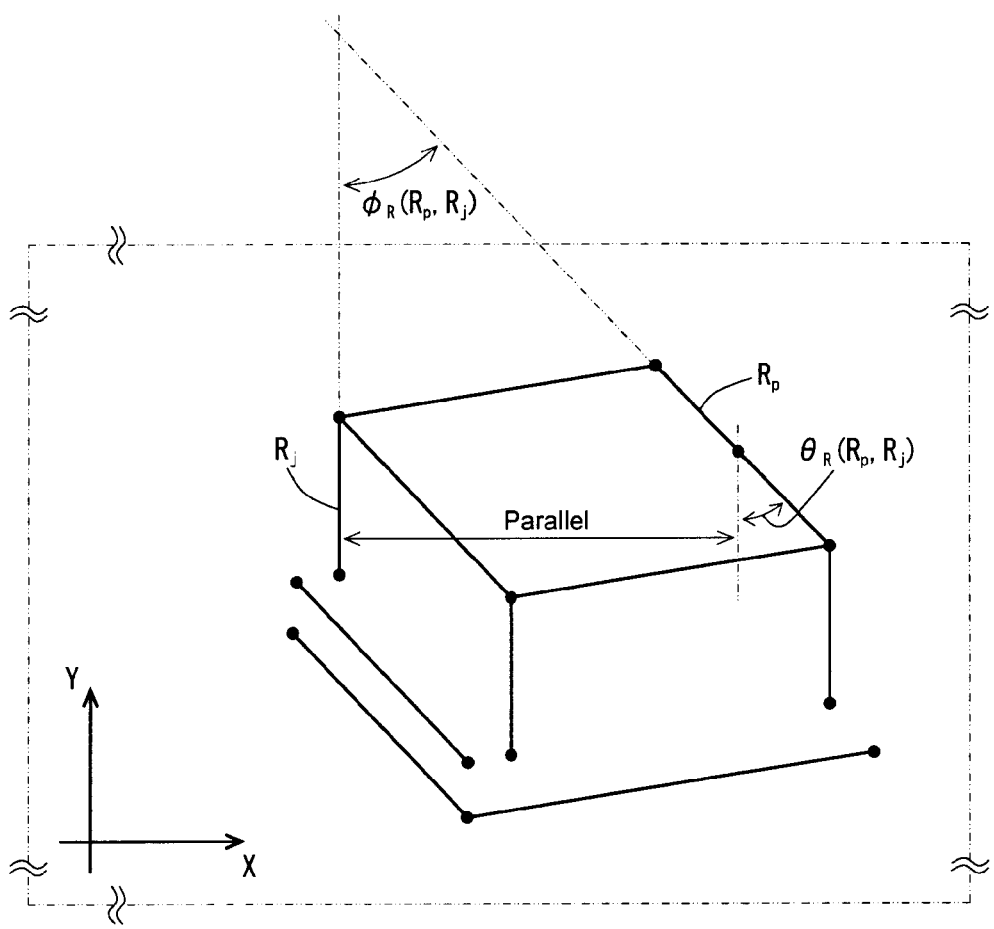
FIG. 13 is an explanatory diagram for explaining the recognition of a shape feature of a workpiece.

If there is a condition in which one or more constraint conditions are not satisfied, out of the constraint conditions 1 to 3, it is checked whether to satisfy a constraint of a relative orientation. This is the constraint of a relative orientation between the edge which is related to a combination in which one or more constraint conditions 1 to 3 are not satisfied and that which belongs to the first class and is related to a combination in which all the constraint conditions 1 to 3 are satisfied. As shown in FIG. 12 and FIG. 13, when k denotes the number of combinations of the edges that belong to the first class, in which all the constraint conditions 1 to 3 are satisfied; $L_p$ and $R_p$ denote the edges of the first class related to a combination in which all the constraint conditions 1 to 3 are satisfied; $\theta_L(L_p, L_i)$ denotes an angle between the edge $L_p$ and a line which passes a middle point of the edge $L_p$ and which is parallel to the edge $L_i$; $\theta_R(R_p, R_j)$ denotes an angle between the edge $R_p$, and a line which passes a middle point of the edge $R_p$ and which is parallel to the edge $R_j$; $\varnothing_L(L_p, L_i)$ denotes an angle formed by lines each parallel to the edges $L_p$ and $L_i$; and $\varnothing_R(R_p, R_j)$ denotes an angle formed by lines each parallel to the edges $R_p$ and $R_j$. If a value (value of LOC ($L_i$, $R_j$)) obtained by the following expression (Expression 5) is smaller than a predetermined threshold value, the condition is satisfied.

$$LOC(L_i, R_j) = \quad \text{[Expression 5]}$$
$$\frac{1}{2k}\sum_{p=1}^{k}\left[\max\left(1 - \frac{|\theta_L(L_p, L_i) - \theta_R(R_p, R_j)|}{\pi/32}, 0\right) + \max\left(1 - \frac{|\phi_L(L_p, L_i) - \phi_R(R_p, R_j)|}{\pi/32}, 0\right)\right]$$

When the combination of the edges in which all the constraint conditions 1 to 3 are satisfied, or the combination of the edges in which the constraint of the relative orientation is satisfied, is evaluated, it is determined that the edges $L_i$ and $R_j$ related to the combination are in a corresponding relation. In FIG. 9, it is determined that the edge of numeral L21 and that of R21, the edge of numeral L22 and that of R22, the edge of numeral L23 and that of R23, the edge of numeral L24 and that of R24, and the edge of numeral L25 and that of R25 are in a corresponding relation, respectively. Similar to the first class, combinations that satisfy these conditions are evaluated out of all the combinations.

Finally, with respect to the edges of the third class, similarly to the second class, a combination of the edges (combination of an edge $L_i$ detected in one two-dimensional gray-level image and an edge $R_j$ detected in the other two-dimensional gray-level image) is evaluated (step S25). In the third class, the constraint of a relative orientation is between edges related to a combination in which one or more constraint conditions 1 to 3 are not satisfied, and edges which are of the first and second classes and which are related to a combination in which all the constraint conditions 1 to 3 are satisfied (the second class includes a combination that satisfies the constraint of a relative orientation, even when any one of the constraint conditions 1 to 3 is not satisfied).

When the combination of the edges in which all the constraint conditions 1 to 3 are satisfied, or the combination of the edges in which the constraint of a relative orientation is satisfied, is evaluated, it is determined that the edges $L_i$ and $R_j$ related to the combination are in a corresponding relation. In FIG. 9, it is determined that the edge of numeral L31 and that of R31 are in a corresponding relation. Similar to the first and second classes, combinations that satisfy these conditions are evaluated out of all the combinations.

In this manner, when the corresponding relation between the edge $L_i$ detected in one two-dimensional gray-level image and the edge $R_j$ detected in the other two-dimensional gray-level image is recognized (when the corresponding relation of the edges between the two-dimensional gray-level images is evaluated), the internal parameters stored in the camera-parameter storing section 16 are read out, and the distance between the optical axis of the first CCD camera 13 and that of the second CCD camera 14 is read out from the inter-optical-axis storing section (not shown) (step S26). Thereafter, based on the edges determined to have a corresponding relation, the read-out internal parameters, and the distance between the optical axes, position information of the edge portions of the workpiece W in a three-dimensional space is calculated by a principle of triangulation, and based on the calculated position information, the shape feature of the workpiece W is recognized. The recognized shape feature of the workpiece W is transmitted to the object recognizing section 20 (step S27), and then, the series of processes is completed.

Figure 14:
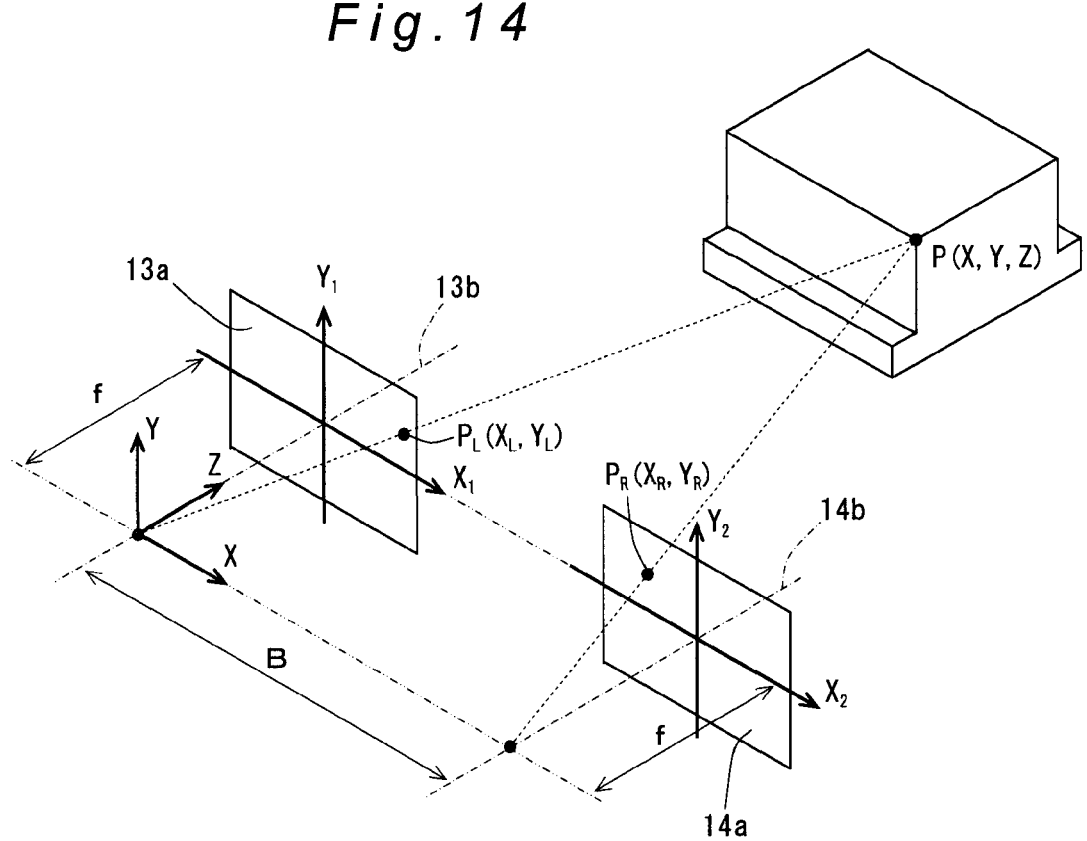
FIG. 14 is an explanatory diagram for explaining calculation of position information using a principle of a triangulation.

A method of calculating the position information (coordinate position) in the three-dimensional space using the principle of triangulation is now briefly described. As shown in FIG. 14, when a certain point P(X, Y, Z) in a space is projected on a point $P_L(X_L, Y_L)$ and a point $P_R(X_R, Y_R)$ on image-pickup surfaces 13a and 14a of the CCD cameras 13 and 14, f denotes a focal length of each of the CCD cameras 13 and 14; and B denotes a distance between the optical axes 13b and 14b of the CCD cameras 13 and 14. In this case, the point P(X, Y, Z) is expressed below. Thereby, a position of the point P in which each of the CCD cameras 13 and 14 is used as a reference can be calculated.

$$X = \frac{Z}{f} X_L \qquad \text{[Expression 6]}$$

$$Y = \frac{Z}{f} Y_L \qquad \text{[Expression 7]}$$

$$Z = \frac{Bf}{X_L - X_R} \qquad \text{[Expression 8]}$$

In the illustrated example, points of intersection between the optical axes 13b and 14b of the CCD cameras 13 and 14 and the image-pickup surfaces 13a and 14a thereof are zero points of coordinate systems on the image-pickup surfaces 13a and 14a, and a focal point of the first CCD camera 13 is a zero point of an X-Y-Z coordinate system. The coordinate systems on the image-pickup surfaces 13a and 14a are parallel to the X-axis and the Y-axis.

The first model-data storing section 19 stores data related to a three-dimensional model of the workpiece W mounted and fixed on the table 40 (mount section 40a), the model data including at least shape data that defines a shape of the workpiece W. The first model-data storing section 19 may store model data about one type of workpiece W only, or may store model data about a plurality of workpieces W which shall be mounted and fixed on the table 40.

Figure 15:
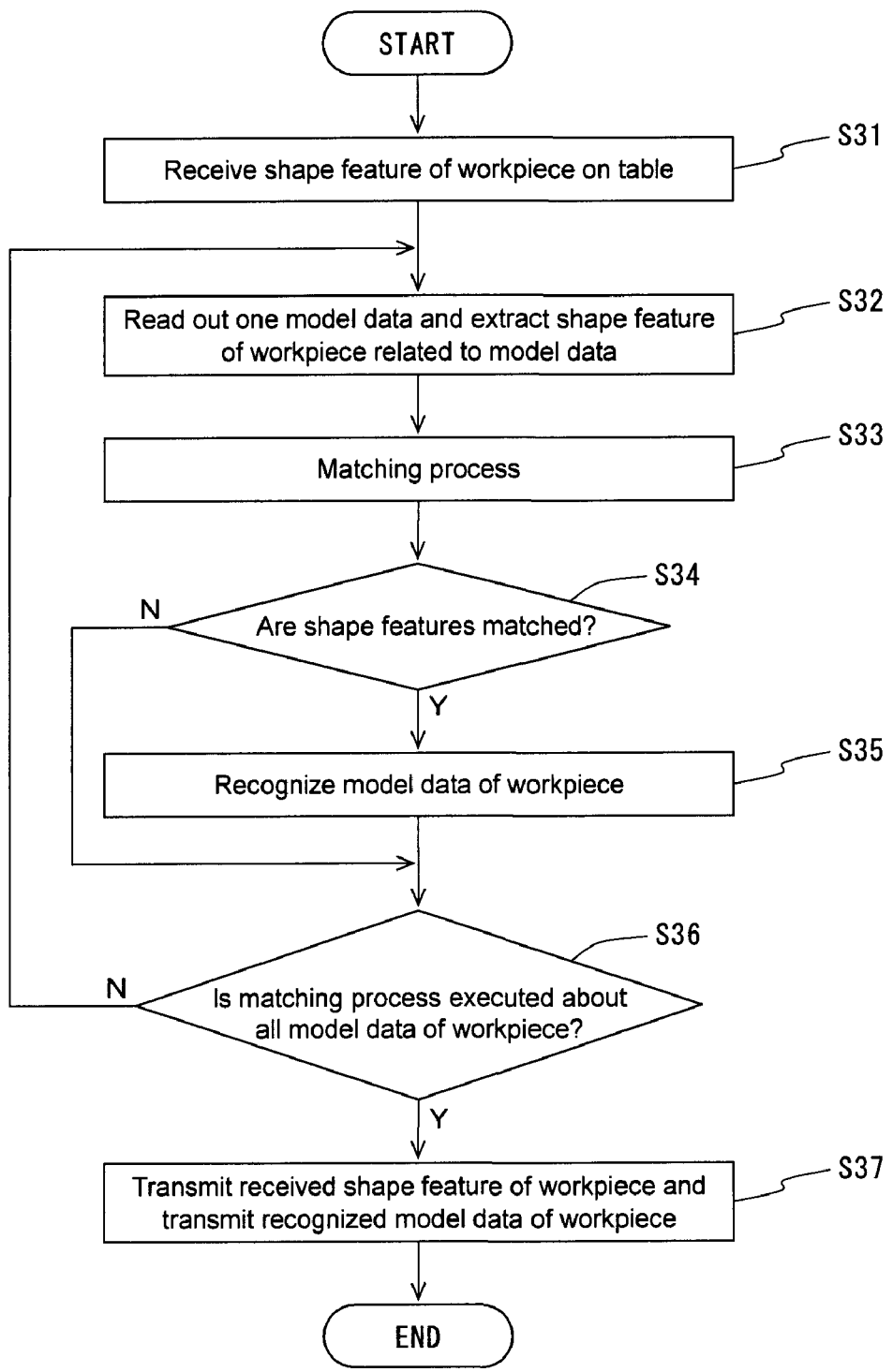
FIG. 15 is a flowchart showing a series of processes in an object recognizing section of the embodiment.

The object recognizing section 20 performs a series of processes shown in FIG. 15, and based on the shape feature of the workpiece W recognized by the shape-feature recognizing section 18 and the model data of the workpiece W stored in the first model-data storing section 19, recognizes the model data of the workpiece W imparted with the shape feature.

That is, the object recognizing section 20 receives the shape feature of the workpiece W (the workpiece W mounted and fixed on the table 40) transmitted from the shape-feature recognizing section 18 (step S31), and then, reads out the model data of the workpiece W stored in the first model-data storing section 19, and based on the read-out model data, extracts the shape feature (data related to the edges, for example) of the workpiece W related to the model data (step S32).

Subsequently, the object recognizing section 20 performs a matching process to compare the extracted shape feature and the received shape feature, and checks whether the shape features match (step S33). Specifically, in the case where all five constraint conditions are satisfied, the object recognizing section 20 determines that the extracted shape feature and the received shape feature match. A first constraint is related to a length of edges; a second constraint is related to a connection relationship between edges; a third constraint is related to an angle relationship of edges; a fourth constraint is related to a distance relationship of edges; and a fifth constraint is related to a common plane relationship of edges.

When determining that the shape features match (step S34), the object recognizing section 20 recognizes the model data imparted with the extracted shape feature (step S35), and thereafter, advances to a step S36. When determining that the shape features do not match (step S34), the object recognizing section 20 advances to a step S36.

At the step S36, the object recognizing section 20 checks whether the matching process has been performed on all the model data of the workpiece W stored in the first model-data storing section 19. When determining that the matching process has not been performed, the object recognizing section 20 repeats the processes after the step S32. On the other hand, when determining that the matching process has been performed, the object recognizing section 20 transmits the shape feature of the workpiece W received at the step S31 and the model data recognized at the step S35 to the model-data generating section 22 (step S37), and the object recognizing section 20 completes the series of processes. In this manner, the object recognizing section 20 recognizes, out of the model data of the workpiece W stored in the first model-data storing section 19, the model data of the workpiece W imparted with the shape feature that matches the shape feature recognized by the shape-feature recognizing section 18.

The second model-data storing section 21 stores data related to a three-dimensional model of the machine tool 30, the model data including at least shape data that defines a shape of the machine tool 30. The model data of the machine tool 30 is configured such that model data related to constituents of the machine tool 30 such as the bed 31, the first saddle 36, the second saddle 37, the spindle head 38, the main spindle 39 (including the tool T), and the table 40, for example, are respectively correlated with one another. The model data of the machine tool 30 is set such that its coordinate system is equal to that of the actual machine tool 30.

Figure 16:
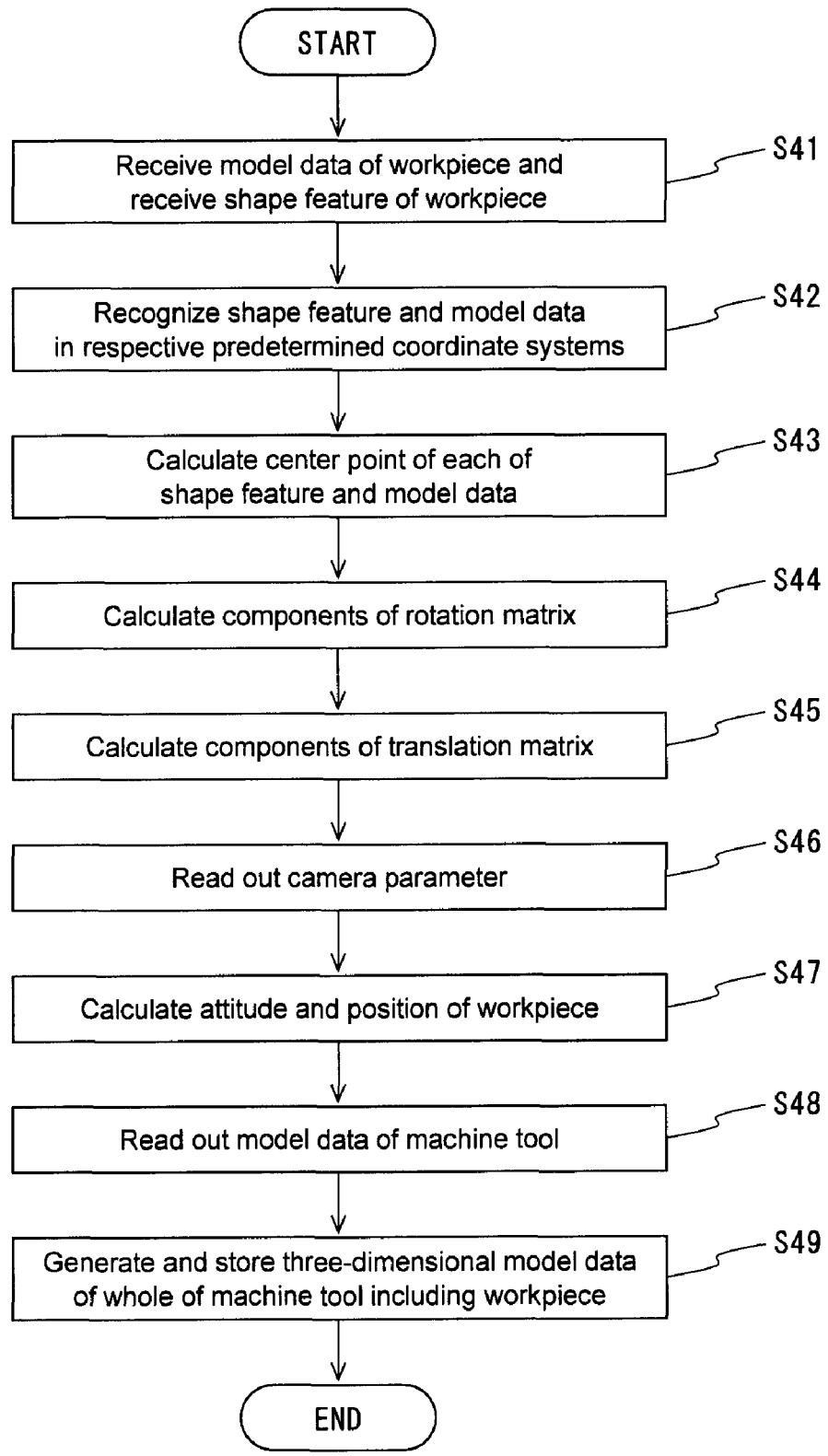
FIG. 16 is a flowchart showing a series of processes in a model-data generating section of the embodiment.

The model-data generating section 22 performs a series of processes as shown in FIG. 16, and based on the external parameters (parameters indicating positions and attitudes of the CCD cameras 13 and 14) of the CCD cameras 13 and 14 stored in the camera-parameter storing section 16, the shape feature of the workpiece W recognized by the shape-feature recognizing section 18, the model data of the workpiece W recognized by the object recognizing section 20, the model data of the machine tool 30 stored in the second model-data storing section 21, the model-data generating section 22 generates three-dimensional model data of a whole of the machine tool 30 including the workpiece W (in this embodiment, the three-dimensional model data including major constituents of the machine tool 30 and the workpiece W except for a cover and a door of the machine tool 30).

Figure 17:
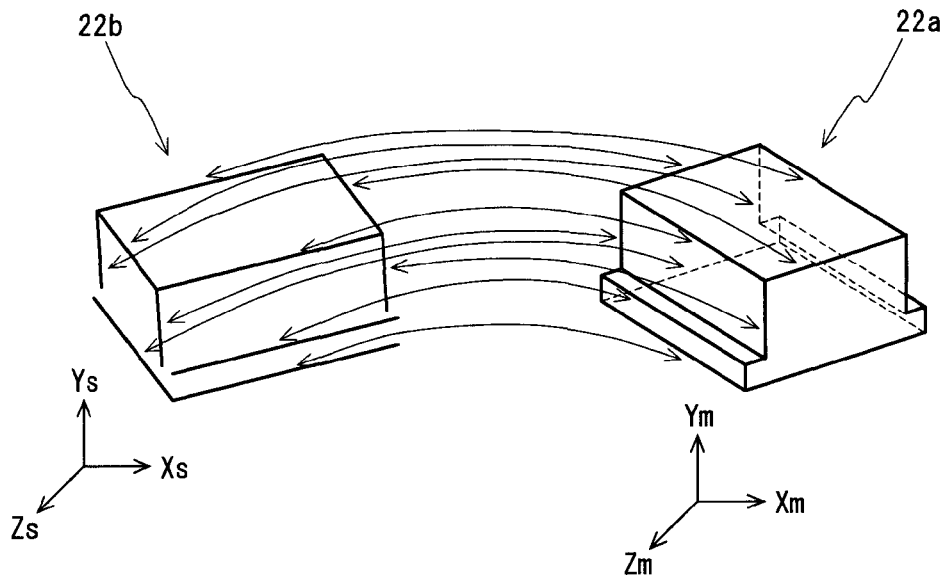
FIG. 17 is an explanatory diagram for explaining calculation of a position and an attitude of a workpiece.

That is, the model-data generating section 22 firstly receives the model data of the workpiece W and the shape feature of the workpiece W transmitted from the object recognizing section 20 (step S41), and as shown in FIG. 17, recognizes model data 22a of the workpiece W in an Xm-Ym-Zm-coordinate system and recognizes shape feature 22b of the workpiece W in an Xs-Ys-Zs-coordinate system (step S42).

Subsequently, the model-data generating section 22 calculates center points (reference points) of the model data 22a of the workpiece W and the shape feature 22b of the workpiece W, and uses the calculated points as zero points (step S43). Thereafter, based on the model data 22a of the workpiece W and the shape feature 22b of the workpiece W, the model-data generating section 22 calculates various components of a rotational matrix indicating a rotational angle, which are obtained when distances between respectively corresponding portions of the shape specified by the model data 22a and the shape feature 22b are the minimum, that is, which are obtained by performing a rotational shift so that the respectively corresponding portions of the shape specified by the model data 22a and the shape feature 22b overlap (step S44) (see FIG. 17). When the distances are rendered the minimum, a least squares method may be used to evaluate a minimum value.

Subsequently, based on a difference between the center point of the model data 22a of the workpiece W and that of the shape feature 22b of the workpiece W, the model-data generating section 22 calculates various components of a translation matrix, that is, the various components of a translation matrix indicating an amount of translation which area obtained by parallel translation so that the respectively corresponding portions of the shape specified by the model data 22a of the workpiece W and the shape feature 22b of the workpiece W overlap (step S45).

Thereafter, the model-data generating section 22 reads out the external parameters of the CCD cameras 13 and 14 stored in the camera-parameter storing section 16 (step S46). Based on the various components of the rotational matrix calculated at the step S44 and the external parameters read out at the step S46, the attitudes, of the three-dimensional model of the workpiece, on the three-dimensional model of the machine tool (attitudes in a coordinate system of the machine tool 30) are calculated. Further, based on the various components of the translation matrix calculated at the step S45 and the external parameters read out at the step S46, positions, of the three-dimensional model of the workpiece, on the three-dimensional model of the machine tool (positions in a coordinate system of the machine tool 30) are calculated (step S47).

Thereafter, the model data of the machine tool 30 stored in the second model-data storing section 21 are read out (step S48). Based on the read-out model data of the machine tool 30, the model data of the workpiece W received at the step S41, the attitudes and positions of the three-dimensional model of the workpiece calculated at the step S47, the model data of the machine tool 30 and the model data of the workpiece W are combined to generate the three-dimensional model data of a whole of the machine tool 30 including the workpiece W. The generated three-dimensional model data are stored in the third model-data storing section 23 (step S49), and the series of processes is completed.

According to the thus-configured apparatus 1 for generating three-dimensional model data of the embodiment, the internal parameters and the external parameters of the CCD cameras 13 and 14 are previously stored in the camera-parameter storing section 16, the model data of the workpiece W is previously stored in the first model-data storing section 19, and the model data of the machine tool 30 is previously stored in the second model-data storing section 21.

When the workpiece W on the table 40 is imaged by the CCD cameras 13 and 14, the two-dimensional gray-level image data of the workpiece W including a part of the table 40 are generated, and the generated data are stored in the image-data storing section 15.

Then, based on each of the two-dimensional gray-level image data stored in the image-data storing section 15 and the internal parameters of the CCD cameras 13 and 14 stored in the camera-parameter storing section 16, with respect to the respective two-dimensional gray-level images, the edges of a workpiece W are detected by the edge detecting section 17. Based on the edges of the workpiece W detected by the edge detecting section 17, the shape feature of the workpiece W is recognized by the shape-feature recognizing section 18.

Thereafter, based on the shape feature of the workpiece W recognized by the shape-feature recognizing section 18 and the model data of the workpiece W stored in the first model-data storing section 19, the model data of the workpiece W imparted with the shape feature are recognized by the object recognizing section 20.

Thereafter, based on the external parameters of the CCD cameras 13 and 14 stored in the camera-parameter storing section 16, the shape feature of the workpiece W recognized by the shape-feature recognizing section 18, the model data of the workpiece W recognized by the object recognizing section 20, and the model data of the machine tool 30 stored in the second model-data storing section 21, the three-dimensional model data of the whole of the machine tool 30 including the workpiece W are generated by the model data generating section 22. The generated three-dimensional model data are stored in the third model-data storing section 23.

In this manner, according to the apparatus 1 for generating three-dimensional model data of the embodiment, based on the two-dimensional gray-level image data each obtained from the CCD cameras 13 and 14, the three-dimensional model data of the whole of the machine tool 30 including the workpiece W fixed on the table 40 are generated. Thus, it is possible to generate easily and effectively correct three-dimensional model data in which the shape of the workpiece W, the attaching position thereof, and the attaching attitude thereof match the actual state. It becomes also possible to perform an interference simulation using the three-dimensional model data according to the actual state of the machine tool 30, thereby providing a precision simulation result.

Thus, an embodiment of the present invention has been described above. It is a matter of course that specific modes in which the present invention can be realized are not limited thereto.

In the above embodiment, the three-dimensional model data of the whole of the machine tool 30 including the workpiece W on the table 40 are generated. The present invention, however, is not limited thereto. Usually, a jig is used to fix the workpiece W on the table 40. Thus, it may be possible to generate three-dimensional model data of the whole of the machine tool 30 including the jig and a workpiece W fixed by the jig. In this case, the workpiece W is mounted on the table 40, for example, and the workpiece W is imaged by the CCD cameras 13 and 14, firstly, to generate the three-dimensional model data of the whole of the machine tool 30 including the workpiece W, as described above. Subsequently, the jig is arranged on the table 40 and the jig and the workpiece W are imaged by the CCD cameras 13 and 14; edges of a jig portion are detected by the edge detecting section 17; a shape feature of the jig is recognized by the shape-feature recognizing section 18; three-dimensional model data of the jig are specified by the object recognizing section 20; and the three-dimensional model data of the whole of the machine tool 30 including the jig and the workpiece W are generated by the model-data generating section 22. Alternatively, in contrary thereto, it may be possible that: firstly, the jig is arranged on the table 40 and the jig is imaged by the CCD cameras 13 and 14; three-dimensional model data of the whole of the machine tool 30 including the jig are generated by the model-data generating section 22; thereafter, the workpiece W is arranged on the table 40 and the jig and the workpiece W are imaged by the CCD cameras 13 and 14; and the three-dimensional model data of the whole of the machine tool 30 including the jig and the workpiece W are generated by the model-data generating section 22. In the first model-data storing section 19, in addition to the model data of the workpiece W, the model data of the jig are also stored.

Further, in addition thereto, the model data in which the workpiece W and the jig are integrally configured are stored in the first model-data storing section 19, the workpiece W and the jig on the table 40 are imaged by the CCD cameras 13 and 14, edges of the workpiece W and the jig are detected by the edge detecting section 17, shape features of the workpiece W and the jig are recognized by the shape-feature recognizing section 18 to specify the three-dimensional model data of the workpiece W and the jig by the object recognizing section 20, whereby the three-dimensional model data of the whole of the machine tool 30 including the workpiece W and the jig may be generated by the model-data generating section 22.

Upon specifying the model data of the workpiece W imaged by the CCD cameras 13 and 14, out of the model data of the workpiece W stored in the first model-data storing section 19, the mount section 40a of the table 40 is rotated in a C-axis direction to image the workpiece W from a plurality of view points, and the shape feature of the workpiece W in each of the view points is recognized to specify the model data of the workpiece W imparted with all of the shape features. In this manner, it becomes possible to specify the model data of the workpiece W with higher precision.

It is not always necessary that two CCD cameras 13 and 14 be arranged. In the case where one of the CCD cameras 13 and 14 is used, the workpiece W is imaged in a position that corresponds to a position where the first CCD camera 13 is disposed and in a position that corresponds to a position where the second CCD camera 14 is disposed. As a result, it becomes possible to obtain two-dimensional gray-level images from two different view points.

When the shape-feature recognizing section 18 evaluates a corresponding relation of the edges between each of the two-dimensional gray-level images, or when the object recognizing section 20 specifies the model data of the workpiece W imparted with the shape feature that matches that recognized by the shape-feature recognizing section 18, out of the model data of the workpiece W stored in the first model-data storing section 19, only a constraint condition other than those described above may be used, or the constraint condition other than those described above may be additionally used, or one portion of the constraint conditions may be omitted.

The machine tool 30 in which the apparatus 1 for generating three-dimensional model data is provided is not limited, and any machine tool 30 may be possible. For example, the machine tool 30 may be arranged not only in the vertical machining center as in the embodiment but also in a lathe or the like.

Another modification includes a configuration such that the CCD cameras 13 and 14 do not output the two-dimensional gray-level image data but output two-dimensional color images, and based on the two-dimensional color images, the edges of the workpiece W are detected, or the shape feature of the workpiece W is recognized.

Figure 18:
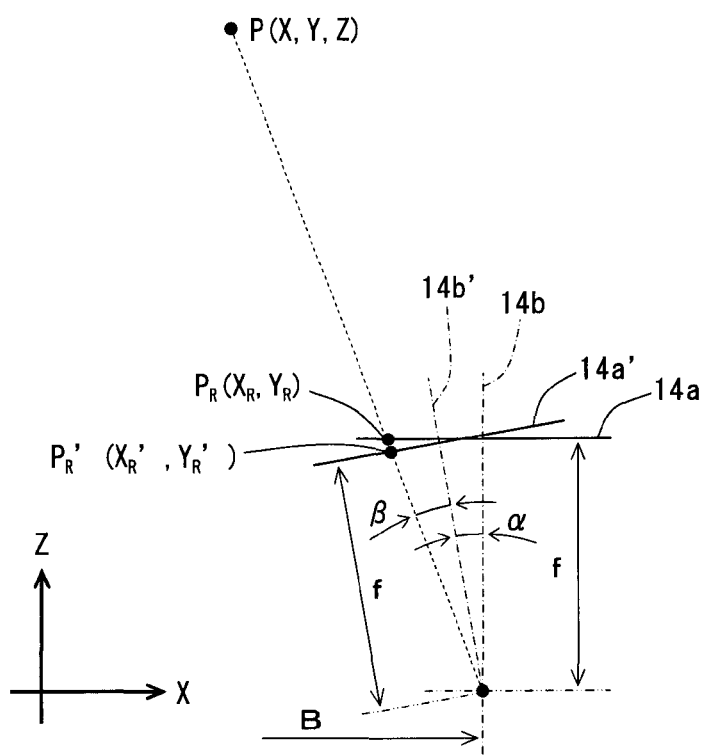
FIG. 18 is an explanatory diagram for explaining calculation of a position information by a principle of a triangulation.

Further, in the above example, the first CCD camera 13 and the second CCD camera 14 are disposed such that their optical axes are parallel, but are not always limited thereto, and may be disposed such that the optical axes are tilted at a predetermined angle with respect to a state that the optical axes are parallel. For example, as shown in FIG. 18, a case where the second CCD camera 14 is disposed such that the optical axis 14b' is tilted by only an angle of α with respect to a state where the optical axis 14b' is parallel to that of the first CCD camera 13 is now considered. At this time, when the certain point P(X, Y, Z) in a space is projected on a point $P_R'(X_R', Y_R')$ on an image-pickup surface 14a' of the second CCD cameras 14, the point $P_R(X_R, Y_R)$ that should be projected on the image-pickup surface 14a when the optical axis 14b of the second CCD camera 14 is parallel to that of the first CCD camera 13 can be calculated according to the following expression. Thus, by using the following expression, the point projected on the image-pickup surface 14a' when the optical axis 14b' of the second CCD camera 14 is not parallel to that of the first CCD camera 13 is corrected to calculate a coordinate value of the point that should be projected on the image-pickup surface 14a when the optical axis 14b of the second CCD camera 14 is parallel to that of the first CCD camera 13. In this manner also, the point P (X, Y, Z) can be evaluated from the above-described expression 6 to the expression 8. It is noted that a reference numeral f denotes a focal length, and B denotes a distance, at its focal point, between the optical axes 13b and 14b of the CCD cameras 13 and 14.

$$X_R = f \cdot \tan(\alpha + \beta) \quad \text{[Expression 9]}$$

$$\beta = \tan^{-1}\left(\frac{X_R'}{f}\right)$$

$$Y_R = \frac{Y_R'}{\frac{f}{\cos\beta}} \times \frac{f}{\cos(\alpha + \beta)} \quad \text{[Expression 10]}$$

$$\beta = \tan^{-1}\left(\frac{X_R'}{f}\right)$$

INDUSTRIAL APPLICABILITY

As described above, the present invention can be preferably applicable to a method and an apparatus for generating three-dimensional model data, which generate three-dimensional model data including an attached object attached to a machine tool and a part of the machine tool.

The invention claimed is:
1. A method for generating three-dimensional model data including an attached object attached to a machine tool and at least a part of the machine tool, comprising:
   a first step of storing three-dimensional model data into a storing section, the three-dimensional model data being related to a three-dimensional models of the at least part of the machine tool and the attached object attached to the machine tool, and including at least shape data that define shapes of the machine tool and the attached object;
   a second step, in which imaging means are used to image the attached object attached to the machine tool from two view points, i.e., a first view point and a second view point apart from the first view point, for generating two-dimensional image data at each of the view points;
   a third step of recognizing a shape feature of the attached object based on the two-dimensional image data generated in the second step;
   a fourth step of extracting, based on the three-dimensional model data of the attached object stored in the storing section, a shape feature of the attached object of the three-dimensional model data and checking whether the extracted shape feature matches the shape feature recognized in the third step, and thereby recognizing, out of the three-dimensional model data stored in the storing section, three-dimensional model data of the attached object imparted with the shape feature matching the shape feature recognized in the third step; and a fifth step of calculating a position and an attitude, of the three-dimensional model of the attached object, on the three-dimensional model of the machine tool, based on the shape feature recognized in the third step and the three-dimensional model data recognized in the fourth step, and thereafter, combining the three-dimensional model data of the attached object recognized in the fourth step with the three-dimension model data, stored in the storing section, related to the at least part of the machine tool and thereby generating the three-dimensional model data including the attached object and at least the part of the machine tool, based on the calculated position and attitude, the three-dimensional model data recognized in the fourth step, and the three-dimensional model data, stored in the storing section, related to the at least part of the machine tool, wherein each step is sequentially performed.

2. An apparatus for generating three-dimensional model data including an attached object attached to a machine tool and at least a part of the machine tool, comprising:

first imaging means for imaging the attached object attached to the machine tool to generate two-dimensional image data;

second imaging means, disposed apart from the first imaging means, for imaging the attached object attached to the machine tool to generate two-dimensional image data;

first model-data storing means for storing three-dimensional model data related to a three-dimensional model of the attached object attached to the machine tool, the three-dimensional model data including at least shape data that define a shape of the attached object;

second model-data storing means for storing three-dimensional model data related to a three-dimensional model of the at least part of the machine tool, the three-dimensional model data including at least shape data that define a shape of the at least part of the machine tool;

image processing means, based on the two-dimensional image data generated by the first and second imaging means, for recognizing a shape feature of the attached object;

object recognizing means for extracting, based on the three-dimensional model data stored in the first model-data storing means, a shape feature of the attached object of the three-dimensional model data, and checking whether the extracted shape feature matches the shape feature recognized by the image processing means, and thereby recognizing, out of the three-dimensional model data stored in the first model-data storing means, three-dimensional model data of the attached object imparted with the shape feature matching the shape feature recognized by the image processing means; and model-data generating means for calculating, based on the three-dimensional model data recognized by the object recognizing means and the shape feature recognized by the image processing means, a position and an attitude, of the three-dimensional model of the attached object, on the three-dimensional model of the machine tool, and thereafter, combining the three-dimensional model data of the attached object recognized by the object recognizing means with the three-dimensional model data, stored in the second model-data storing means, related to the at least part of the machine tool and thereby generating three-dimensional model data including the attached object and at least the part of the machine tool, based on the calculated position and attitude, the three-dimensional model data recognized by the object recognizing means, and the three-dimensional model data stored in the second model-data storing means.

3. The apparatus for generating three-dimensional model data according to claim 2, wherein the second imaging means is disposed such that its optical axis is parallel to an optical axis of the first imaging means, and that it is kept apart by a distance from the first imaging means in a direction perpendicular to the optical axis of the first imaging means.

4. The apparatus for generating three-dimensional model data according to claim 2, wherein the image processing means comprises:

edge detecting means for, by extracting corners of the attached object based on the two-dimensional image data generated by the first and second imaging means, and detecting edges that connect between the extracted corners, detecting the edges of the attached object in each of the two-dimensional images; and shape-feature recognizing means for evaluating a corresponding relation of the edges between each of the two-dimensional images based on the edges in the two-dimensional images detected by the edge detecting means, and recognizing the shape feature of the attached object based on the edges determined to have the corresponding relation.

5. The apparatus for generating three-dimensional model data according to claim 2, wherein the model-data generating means calculates, based on the shape feature of the attached object recognized by the image processing means and the three-dimensional model data of the attached object recognized by the object recognizing means, various components of a matrix indicating a rotational angle and a matrix indicating an amount of translation, which are obtained when a rotational shift and translation are performed so that respectively corresponding portions of a shape specified by the shape feature and the model data overlap to calculate the attitude and the position, of the three-dimensional model of the attached object, on the three-dimensional model of the machine tool, based on the calculated components of each matrix.

6. An apparatus for generating three-dimensional model data including an attached object attached to a machine tool and at least a part of the machine tool comprising:

a first imaging camera for imaging the attached object attached to the machine tool to generate two-dimensional image data;

a second imaging camera, disposed apart from the first imaging camera, for imaging the attached object attached to the machine tool to generate two-dimensional image data;

a first model-data storage for storing three-dimensional model data related to a three-dimensional model of the attached object attached to the machine tool, the three-dimension model data including at least shape data that define a shape of the attached object;

a second model-data storage for storing three-dimensional model data related to a three-dimensional model of the at least part of the machine tool, the three-dimensional model data including at least shape data that define a shape of the at least part of the machine tool;

an image processor, based on the two-dimensional image data generated by the first and second imaging cameras, for recognizing a shape feature of the attached object;

an object recognizing processor for extracting, based on the three-dimensional model data stored in the first model-data storage, a shape feature of the attached object of the three-dimensional model data, and checking whether the extracted shape feature matches the shape feature recognized by the image processor, and thereby recognizing, out of the three-dimensional model data stored in the first model-data storage, three-dimensional model data of the attached object imparted with the shape feature matching the shape feature recognized by the image processor; and a model-data generator for calculating, based on the three-dimensional model data recognized by the object recognizing processor and the shape feature recognized by the image processor, a position and an attitude, of the three-dimensional model of the attached object, on the three-dimensional model of the machine tool, and thereafter, combining the three-dimensional model data of the attached object recognized by the object recognizing processor with the three-dimensional model data, stored in the second model-data storage, related to the at least part of the machine tool and thereby generating three-dimensional model data including the attached object and at least the part of the machine tool, based on the calculated position and attitude, the three-dimensional model data recognized by the object recognizing processor, and the three-dimensional model data stored in the second model-data storage.

7. The apparatus for generating three-dimensional model data according to claim 6, wherein the second imaging camera is disposed such that its optical axis is parallel to an optical axis of the first imaging camera, and that it is kept apart by a distance from the first imaging camera in a direction perpendicular to the optical axis of the first imaging camera.

8. The apparatus for generating three-dimensional model data according to claim 6, wherein the image processor comprises:

an edge detector for, by extracting corners of the attached object based on the two-dimensional image data generated by the first and second imaging cameras and detecting edges that connect between the extracted corners, detecting the edges of the attached object in each of the two-dimensional images; and a shape-feature recognizing processor for evaluating a corresponding relation of the edges between each of the two-dimensional images based on the edges in the two-dimensional images detected by the edge detecting means, and recognizing the shape feature of the attached object based on the edges determined to have the corresponding relation.

9. The apparatus for generating three-dimensional model data according to claim 6, wherein the model-data generator calculates, based on the shape feature of the attached object recognized by the image processor and the three-dimensional model data of the attached object recognized by the object recognizing processor, various components of a matrix indicating a rotational angle and a matrix indicating an amount of translation, which are obtained when a rotational shift and translation are performed so that respectively corresponding portions of a shape specified by the shape feature and the model data overlap to calculate an attitude and a position, of the three-dimensional model of the attached object, on the three-dimensional model of the machine tool, based on the calculated components of each matrix.

* * * * *

UNITED STATES PATENT AND TRADEMARK OFFICE
CERTIFICATE OF CORRECTION

PATENT NO. : 8,335,666 B2  
APPLICATION NO. : 12/281112  
DATED : December 18, 2012  
INVENTOR(S) : Xiaodong Tian et al.

It is certified that error appears in the above-identified patent and that said Letters Patent is hereby corrected as shown below:

Title Page, Item (73);
Change

"(73) Assignee: Intelligent Manufacturing Systems International, San Francisco, CA (US)"

To be

--(73) Assignee: Mori Seiki Co., LTD., Yamatokoriyama-shi, Nara, Japan

Intelligent Manufacturing Systems International, San Francisco, CA (US)--

Signed and Sealed this
Fourteenth Day of May, 2013

Teresa Stanek Rea
*Acting Director of the United States Patent and Trademark Office*